(12) United States Patent
Bernardy et al.

(10) Patent No.: US 7,475,235 B1
(45) Date of Patent: Jan. 6, 2009

(54) REAL-TIME MANAGEMENT OF A CONFIGURATION OF A COMPUTER SYSTEM

(75) Inventors: Steven R. Bernardy, Roseville, MN (US); Patrick W. Cummings, Ramsey, MN (US); James P. Kramer, Coon Rapids, MN (US); Mitch M. Maurer, Brooklyn Park, MN (US)

(73) Assignee: Unisys Corporation, Blue Bell, PA (US)

( * ) Notice: Subject to any disclaimer, the term of this patent is extended or adjusted under 35 U.S.C. 154(b) by 547 days.

(21) Appl. No.: 11/153,781

(22) Filed: Jun. 15, 2005

(51) Int. Cl.
*G06F 15/177* (2006.01)
*G06F 9/00* (2006.01)
*G06F 1/24* (2006.01)

(52) U.S. Cl. .................. 713/1; 713/2; 713/100
(58) Field of Classification Search ............. 713/1, 713/2, 100
See application file for complete search history.

(56) References Cited

U.S. PATENT DOCUMENTS

| | | | |
|---|---|---|---|
| 5,850,539 A * | 12/1998 | Cook et al. ................ 703/20 |
| 6,161,150 A * | 12/2000 | Sudhakaran et al. ........... 710/8 |
| 6,256,635 B1 * | 7/2001 | Arrouye et al. ............. 707/102 |
| 6,353,884 B1 * | 3/2002 | Schmitz et al. ................ 713/1 |
| 6,560,699 B1 * | 5/2003 | Konkle ......................... 713/1 |
| 7,117,348 B2 * | 10/2006 | Holmberg et al. ............. 713/1 |
| 7,188,062 B1 * | 3/2007 | Rieschl et al. ................ 703/23 |
| 2006/0248323 A1 * | 11/2006 | Ewing et al. ................... 713/1 |

* cited by examiner

*Primary Examiner*—Thomas Lee
*Assistant Examiner*—Ji H Bae
(74) *Attorney, Agent, or Firm*—Charles A. Johnson; Robert Marley; Shumuker & Sieffert, PA

(57) ABSTRACT

A computer system is described for representing and enforcing configuration rules that can be used to create and define a configuration or hardware definition for the computer system. The computer system represents configuration rules that define a configuration of a high end mainframe, such as an OS2200 system, in a file external to a configuration program with which a user may interact to manage the configuration of the mainframe system, and to enforce the configuration rules as a user is attempting to modify a configuration of a computer system. The configuration rules may be specified in, for example, an extensible markup language (XML) file format rather than in the source code of the executable program. The external configuration file may conform to a scripting language that allows a developer to embed validation operations for the configuration data specified in the XML file.

23 Claims, 12 Drawing Sheets

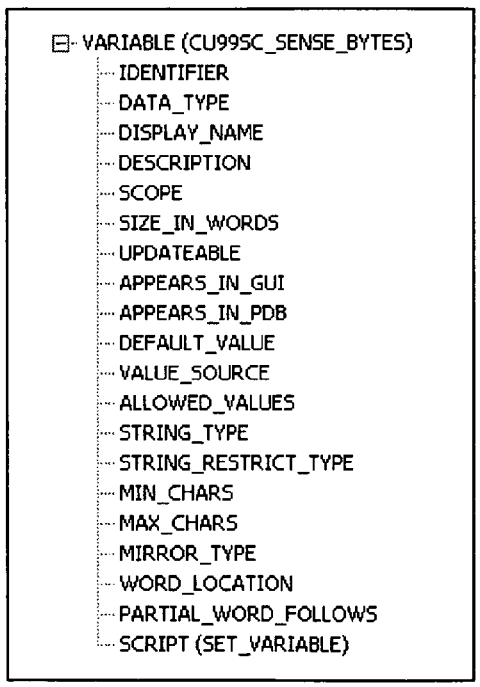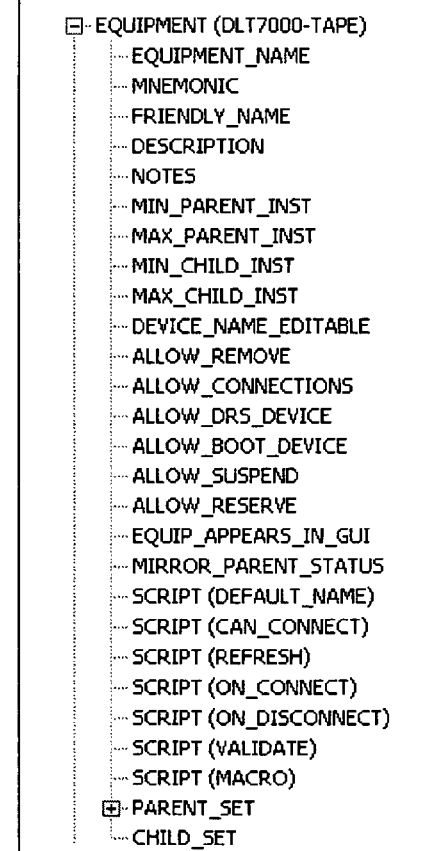
FIG. 9
FIG. 10

REAL-TIME MANAGEMENT OF A CONFIGURATION OF A COMPUTER SYSTEM

TECHNICAL FIELD

The invention relates to computer systems and, more particularly, to computer-implemented techniques for managing configuration rules for a computer system.

BACKGROUND

Existing systems for managing the configuration of OS2200 systems or other operating systems running on high-end mainframes include configuration rules for validation of user-defined configuration data stored within one or more configuration files. Typically, a user is required to create and/or modify the configuration data in its entirety before executing a separate verification application. When the verification application returns errors, the user investigates and attempts to fix each of the returned errors one-by-one and again invokes the verification application.

Often, source code associated with the verification application must be modified, recompiled, and repackaged in order to modify, add or delete validation rules used to validate the configuration data. Recompiling and repackaging the source code is time-consuming and error prone process.

SUMMARY

In general, the invention is directed to techniques for representing and enforcing configuration rules that can be used to create and define a configuration or hardware definition for a computer system. For example, the techniques are designed to represent configuration rules that define a configuration of a high end mainframe, such as an OS2200 system, in a file external to an configuration program with which a user may interact to manage the configuration of the mainframe system, and to enforce the configuration rules as a user is attempting to modify a configuration of a computer system. The configuration rules may be specified in, for example, an extensible markup language (XML) file format rather than in the source code of the executable program.

The external configuration file may conform to a scripting language that allows a developer to embed validation operations for the configuration data specified in the XML file. As a result, a developer may modify rules in the external configuration file without affecting the validation program. As a result, rule validation may be performed for a single configuration operation in real-time since the configuration program is not required to have prior knowledge about the validation rules. Consequently, the source code of the validation program does not have to be modified, recompiled, or repackaged each time a rule is added, modified, or deleted and a user can be notified when a rule is broken in real-time.

As described herein, the techniques provide an external configuration file, also referred to as a hardware definition file (HDF), that drives a configuration program with which a user interacts to configure a computer system, such as a high-end mainframe. The HDF maintains both configuration data and validation logic, for example, in a single XML file. For example, the HDF may include a complete listing of the supported hardware components and each hardware component's properties and validation logic in the form of configuration rules and connection rules. For example, the HDF may be an XML file that describes the supported equipment or hardware components for a single hardware configuration.

In accordance with the invention, an HDF includes a scripting language with syntax that can be embedded in XML and ignored by conventional XML parsers, thereby allowing logic or operations to be defined around data identified in the XML file format. More specifically, the scripting language allows a script to be positioned between XML tags because the scripting language special-character set does not overlap the XML special-character set. As a result, a developer is not required to separate validation logic performed on given configuration data into code and XML, respectively. Rather, the validation logic may be stored with the associated configuration data in the same HDF, thereby providing object-orientation within XML tags. Further, a developer may modify rules in the HDF without affecting the configuration program. Consequently, the source code of the configuration program does not have to be modified, recompiled, and repackaged each time a rule is added, modified, or deleted.

A user may interact with a configuration program executing on the computer system to create or modify a configuration or hardware definition of the computer system. In particular, the configuration program utilizes an HDF to enforce configuration rules, such as connection rules and property selection capabilities. The configuration program itself does not have any knowledge about the particular hardware components, for example, a SCSI2W channel, prior to loading the HDF. However, upon loading the HDF, the configuration program retains all of the configuration information contained in the HDF. The source code of the configuration program includes triggers that fire upon certain events, such as modification of a property of an entity. Upon firing, the configuration program loads a rule check method from memory or, alternatively, from the HDF if the method is not already in memory.

The rules that are applied may be associated with a single operation. The rule check method returns a value when the rule is invalid. In this case, the configuration program may display error information to the user based on the value returned by the method. Unresolved errors that exist for that particular operation are deleted, but may be reproduced if the errors are still valid after the rule check has been performed. As a result, rule validation is very quick and undetectable or transparent to the user unless the check does not pass. In other words, the invention enables real-time rule validation and allows the configuration program to inform a user that a rule is broken as the user is attempting to modify a configuration. In addition, a separate verification step is not necessary prior to building the configuration.

Each HDF may include configuration data identified by XML and hardware definition scripts written in accordance with the inventive scripting language. Hardware definition scripts may be embedded in the XML data and provide the ability to make logical decisions based on the contents of an HDF. The configuration program with which the user interacts to create or modify a configuration or hardware definition of a computer system utilizes an HDF to determine the configuration data and the corresponding validation logic for application to the respective configuration data. For example, hardware definition scripts may be embedded in the HDF and used by the configuration program to generate default device data, i.e., the device's name and address, enforce connection rules, and to ensure the system configuration remains valid.

A hardware definition script of an HDF may include a global and a validate script. In addition, specific script routines may exist in equipment and equipment style components. Generally, the global and validate scripts exist to organize variables and macros that are used by multiple equipment or equipment style scripts. The global script is a container for script macros that are used in multiple components throughout the hardware definition and generally support the device structure and naming. In particular, the global script may allow users to configure devices with multiple upward connections.

Validate scripts may be used to verify that a valid system configuration exists for a given partition and is initiated by the configuration program whenever a partition is updated or a partition file is generated. Validate operations are executed in order to check for invalid system configurations. Before the configuration program generates a partition profile, the configuration program runs the validate scripts. If any of these scripts generate an error, the user is notified, and the partition profile is not created. The configuration program may also perform real-time validation, i.e., notifying users of errors as the user modifies the system configuration.

In one embodiment, the invention is directed to a computer system comprising a set of hardware components, a configuration file having configuration data for the set of hardware components and embedded scripts for validating the configuration data, and a configuration program executing on the computer system, wherein the configuration program parses the configuration file to identify the scripts, and executes the scripts to validate the configuration data.

In another embodiment, the invention is directed to a computer-implemented method comprising maintaining a configuration file having configuration data for a set of hardware components associated with a computer system and embedded scripts for validating the configuration data, and executing a configuration program on the computer system that parses the configuration file to identify the scripts and executes the scripts to validate the configuration data.

In another embodiment, the invention is directed to a computer system comprising a set of hardware components, a configuration file having configuration data for the set of hardware components and embedded scripts for validating the configuration data, means for parsing the configuration file to identify the configuration data and any corresponding embedded scripts, and means for executing the scripts in real-time to validate the configuration data in response to operations by the user.

The invention may provide one or more advantages. For example, unlike executable programs that represent all configuration rules solely in source code, the described techniques store configuration data and rules in an XML file format external to the executable program. Consequently, a developer may add, modify, or delete rules in the external configuration file rather in the source code of the executable program. As a result, the source code of the configuration program does not have to be modified, recompiled, and repackaged each time a rule is added, modified, or deleted.

Further, rule validation may be performed as a user modifies the configuration of the computer system rather than performing a separate verification process after a configuration is complete. Wholesale verification requires fixing errors that have been returned one-by-one followed by performing another wholesale verification. In some cases, several wholesale verifications may be performed until no errors are returned. In contrast, the described techniques enable the user to be notified of an error in real-time, i.e., as the errors occur. Thus, the user can fix the errors right away without having to address other configuration data in-between. Alternatively, the user may also choose to fix the error at a later time. In this case, any errors that aren't fixed are retained until they are fixed. In any case, the user is in complete control of fixing errors. Thus, a user can fix an error without losing his or her train of thought rather than modifying a configuration in its entirety followed by performing wholesale verification.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIGS. 6-18 are screen illustrations of an example user interface for generating external configuration files.

DETAILED DESCRIPTION

Figure 1:
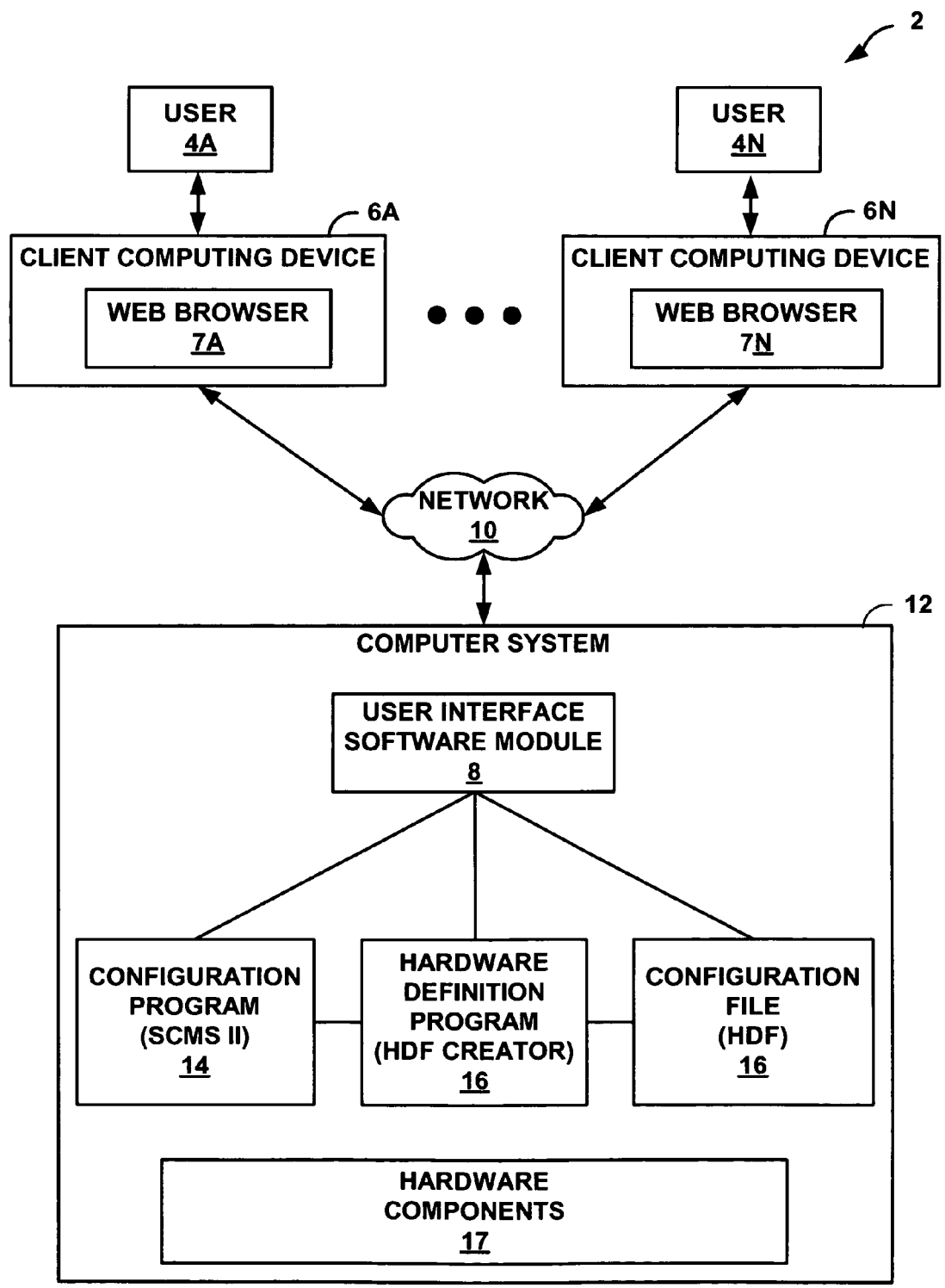
FIG. 1 is a block diagram illustrating an exemplary system in which users interact with a user interface to manage a configuration of a computer system in accordance with an embodiment of the invention.

FIG. 1 is a block diagram illustrating a system 2 in which a computer system 12 presents a user interface with which users 4A-4N (collectively, "users 4") interact to manage a configuration or hardware definition for computer system 12 in accordance with the techniques described herein. As shown in FIG. 1, computer system 12 is communicatively coupled to a number of computing devices 6A-6N (collectively, "computing devices 6") by a network 10. Computing devices 6 include web browser modules 7A-7N (collectively, "web browsers 7"), respectively, or other client-side software for remotely interacting within computer system 12. Although not shown, computer system 12 may be directly coupled to a local display and input/output devices (e.g., a keyboard and pointing device) by which a local user directly interacts with computer system 12. In any event, user interface software module 8 of computer system 12 operates as a means for presenting a user interface with which users 4 interact to manage configuration for computer system 12.

Computer system 12 may, for example, include a mainframe computer system, a server, or other computer system having a hardware architecture that can be configured by users 4 interacting with computing devices 6. In particular, computer system 12 may comprise, for example, a computer system having a system configuration in which an individual hardware component may have multiple upward connections to separate parent hardware components, such as a ClearPath Plus™ server with an OS2200 system configuration, or other servers developed by Unisys of Blue Bell, Pa.

Users 4 may use a variety of computing devices 6 to manage a configuration for computer system 12. For example, users 4 may manage a configuration for computer system 12 using a workstation, a laptop computer, a desktop computer, or other computing hardware component. Network 10 represents any communication network, such as a local area network (LAN). Users 4 may access computer system 12 via a LAN to create and define a configuration for computer system 12, or may remotely access computer system 12 via a virtual private network, remote dial-up, or similar remote access communication mechanism.

In the illustrated example of FIG. 1, user interface software module 8 presents a user interface with which users 4 interact to create and define a configuration or hardware definition for computer system 12, such as an OS2200 system or other high end mainframe. In particular, user interface software module 8 first executes hardware definition program 16 with which users 4 interact to generate a configuration file 18. In general, configuration file 18 describes the supported equipment and each equipment component's properties, configuration rules, and connection rules of a configuration for computer system 12. Next, computer system 12 executes configuration program 14 which utilizes configuration file 18 and with which users 4 interact to validate and apply the configuration of computer system 12.

In one embodiment, hardware definition program 16 may comprise Hardware Definition File (HDF) Creator which is a Windows based application that is used to generate HDF files, such as configuration file 18, for the Site Configuration Management System II (SCMS II). In this embodiment, configuration program 14 may comprise SCMS II. In any case, users 4 may first interact with hardware definition program 16 to generate configuration file 18, which defines configuration rules and data. Users 4 may then interact with configuration program 14, which utilizes configuration file 18, to validate and apply configuration to computer system 12.

As described herein, computer system 12 executes hardware definition program 16 to present a user interface with which users 4 interact to generate configuration file 18. Configuration file 18, also referred to herein as hardware definition file (HDF) 18, is external to configuration program 14 and represents the hardware design of computer system 12 in, for example, an XML file format, as will be described in detail. In general, HDF 18 may define the central complex, i.e., instruction processors, memory modules, I/O processors and consoles of computer system 12. Further, HDF 18 may describe the relationship of the devices included in the central complex, and where the devices are physically located within computer system 12.

In addition, HDF 18 includes the definition of peripherals, e.g., connection rules, properties of each peripheral, allowed values for configuration parameters for each peripheral, default values for each peripheral, and user-friendly descriptions for each peripheral. Accordingly, computer system 12 executes hardware definition program 16 to present a user interface with which users 4 interact to create, view, and modify HDF 18. In some embodiments, hardware definition program 16 provides users 4 a hierarchical listing of the contents of HDF 18, an interface to edit hardware definition componerits and scripts, and an interface to display the property values for the components selected in the hierarchical listing.

HDF 18 maintains data and logic, for example, for a single hardware configuration of computer system 12. For example, HDF 18 may include a complete listing of the supported hardware components and each hardware component's properties, configuration rules, and connection rules. For example, HDF 18 may include configuration data identified by XML with embedded hardware definitions. In addition, HDF may include hardware definition scripts written in a scripting language with syntax that can be embedded in the XML and ignored by conventional XML parsers. In other words, validation scripts may be interleaved within the hardware definitions (i.e., the configuration data) within HDF 18 for application by configuration program 14. Thus, hardware definition scripts embedded in the XML data provide configuration program 14 with the ability to make logical decisions based on the data contained in HDF 18, such as determining the validity of data. More specifically, the scripting language allows a script to be positioned between XML tags because the scripting language special-character set does not overlap the XML special-character set. As a result, users 4 are not required to separate the validation logic and the configuration data into code and XML, respectivley. Rather, the validation logic may be stored external to configuration program 14 and collocated with the associated configuration data in HDF 18, thereby providing object-orientation within XML tags. Accordingly, configuration file 18 allows data and logic to be maintained in a single file or set of files external to configuration program 14. As a result, users 4 are able to modify configuration rules in configuration file 18 without affecting the source code of configuration program 14.

In one embodiment, the hardware definition script of HDF 18 includes a global script and a validate script. In addition, specific script routines may exist within equipment and equipment style components defined with HDF 18. Generally, the global and validate scripts serve to organize variables and macros that are used by multiple equipment or equipment style scripts. The global script is a container for script macros that are used in multiple components throughout HDF 18 and generally support the structure and naming of hardware components 17. In particular, the global script allows users 4 to configure a hardware components 17, which may have multiple upward connections.

The validate script of HDF 18 verifies that a valid system configuration exists for a given partition of computer system 12. Validate scripts may be invoked in real-time to notify users 4 of errors as users 4 modify the system configuration of computer system 12 via configuration system 14, as described below. Validation scripts may also be initiated by configuration program 14 whenever a partition of computer system 12 is updated or a partition file is generated. Validate operations are executed in order to check for invalid system configurations. Before configuration program 14 generates a partition profile, it runs the validate scripts. If any of these scripts generate an error, users 4 are notified, and the partition profile is not created.

After users 4 have generated HDF 18, computer system 12 executes configuration program 14 to present a user interface with which users 4 interact to create or modify a configuration of computer system 12. In contrast to standard configuration programs that include configuration rules and data in the source code, configuration program 14 loads HDF 18, since HDF 18 is external to configuration program 18, and uses the configuration data and rules contained in HDF 18 to create and store a hardware definition for computer system 12. In this manner, configuration program 14 utilizes HDF 18 to enforce configuration rules, such as connection rules and property selection capabilities.

Configuration program 14 itself does not need any knowledge about hardware components 17, for example, a SCSI2W channel, prior to loading HDF 18. However, upon loading HDF 18, configuration program 14 retains all of the configuration information contained in HDF 18. Accordingly, the source code of configuration program 14 includes triggers that fire upon detecting one or more operations, such as modifying a property of an entity. In response, configuration program 14 identifies and invokes a corresponding rule check method, from memory or, alternatively, from HDF 18 if the method is not already in memory. The rule check method may be a script routine, e.g., a validate script, parsed from HDF 18 for use in determining in real-time whether the detected operation results in a valid configuration. The rule check method returns an error code when the operation results in an invalid configuration. In this case, configuration program 14 may display error information to users 4 based on the value returned by the method. Unresolved errors that exist for that particular operation are deleted when the rule check method is invoked, but may be reproduced if the errors are still valid after the rule check has been performed.

In some embodiment, a respective trigger may be associated with each possible operation, i.e., each operation triggers a rule check for a single operation. Thus, real-time rule validation can be very quick and undetectable or relatively transparent to users 4 unless the check does not pass, in which cause users 4 are notified of the error. For example, the following script defines the logic for validating the equipment described in XML in an exemplary configuration file 18. In particular, the XML describes the GUI_GLOBAL_DATA equipment and various properties associated with GUI_GLOBAL_DATA. The validation script is identified by bold font and is run whenever equipment of this type needs to be validated in configuration program 14. In other words, configuration program 14 triggers the validation script whenever users 4 perform an operation that requires this equipment type to be validated.

```
<EQUIPMENT>
  <EQUIPMENT_NAME
    VALUE="GUI_GLOBAL_DATA"/>
  <MNEMONIC VALUE="GUI_GLOBAL_DATA"/>
  <FRIENDLY_NAME VALUE="SYSTEM"/>
  <DESCRIPTION VALUE="ClearPathPlus"/>
  <NOTES VALUE=" "/>
  <MIN_PARENT_INST VALUE="0"/>
  <MAX_PARENT_INST VALUE="0"/>
  <MIN_CHILD_INST VALUE="1"/>
  <MAX_CHILD_INST VALUE="4"/>
  <DEVICE_NAME_EDITABLE VALUE="TRUE"/>
  <ALLOW_REMOVE VALUE="FALSE"/>
  <ALLOW_CONNECTIONS VALUE="FALSE"/>
  <ALLOW_DRS_DEVICE VALUE="FALSE"/>
  <ALLOW_BOOT_DEVICE VALUE="FALSE"/>
  <ALLOW_SUSPEND VALUE="FALSE"/>
  <ALLOW_RESERVE VALUE="FALSE"/>
  <EQUIP_APPEARS_IN_GUI VALUE="TRUE"/>
  <MIRROR_PARENT_STATUS VALUE="FALSE"/>
  <SCRIPT NAME="VALIDATE"
    VALUE="#TEMP(RETURNVAL,0,NUMERIC);#LF;
    #EXECUTE(VALIDATE_MINIMUMS);#LF;#RETURN
    (RETURNVAL);#LF;"/>
  <PARENT_SET/>
  <CHILD_SET>
    <CHILD>
      <NAME VALUE="MEM_GUI"/>
      <MIN VALUE="1"/>
      <MAX VALUE="1"/>
      <CREATE VALUE="TRUE"/>
      <NUM_UP VALUE="1"/>
      <NUM_INCLUDED VALUE="1"/>
      <CANNOT_COEXIST_WITH VALUE=" "/>
    </CHILD>
  </CHILD_SET>
</EQUIPMENT>
```

In particular, the command #TEMP(RETURNVAL,0,NUMERIC) defines a temporary numeric variable named RETURNVAL and assigns RETURNVAL an initial value of 0. The #LF command signifies a line feed (new line) in the script for display purposes since XML parsers and writers ignore normal line feeds. This command gets ignored on execution of the script. The #EXECUTE(VALIDATE_MINIMUMS) command calls and runs the VALIDATE_MINIMUMS macro. The VALIDATE_MINIMUMS macro modifies the RETURNVAL variable and is defined in a global script not shown in this example. The #RETURN(RETURNVAL) command returns the value stored in RETURNVAL thereby allowing configuration program 14 to retrieve and perform operations on the stored value.

Additionally, configuration program 14 may generate a partition profile file (not shown) based on the HDF 18 and the modifications to the hardware definition input by users 4 via the user interface associated with configuration program 14. The partition profile file includes a definition of a partition of computer system 12 and the definition of hardware components of the partition. The partition profile file also includes a partition data bank (PDB) that is used by server control (not shown) associated with computer system 12 to configure and boot the operating system (not shown).

Thus, system 2 provides users 4 a powerful yet more efficient system for managing a configuration of computer system 12. For example, unlike standard configuration systems that statically define configuration data and validation rules in the source code, the configuration data and rules are stored in HDF 18, which is external to configuration program 14. Consequently, users 4 may add, modify, and delete rules in HDF 18 without affecting the source code of configuration program 14. As a result, configuration program 14 does not have to be modified, recompiled, and repackaged each time a rule is added, modified, or deleted.

Furthermore, system 2 allows configuration program 14 to inform users 4 that a rule is broken as users 4 attempt to modify a configuration (i.e., in real-time) rather than performing a separate verification step after a configuration is complete. In contrast to systems that require wholesale verification, system 2 allows users 4 to be notified of an error in real-time, i.e., as the errors occur. Thus, system 2 avoids wholesale verification since users 4 can fix errors as they appear. If users 4 choose to fix an error right away, the error will disappear. Alternatively, the users 4 may also choose to fix the error at a later time. In this case, any errors that aren't fixed are kept track of by configuration program 14 until they are fixed. In any case, users 4 are in complete control of fixing errors. Thus, a user 4 can fix an error without losing his train of thought rather than modifying a configuration in its entirety followed by performing wholesale verification.

Figure 2:
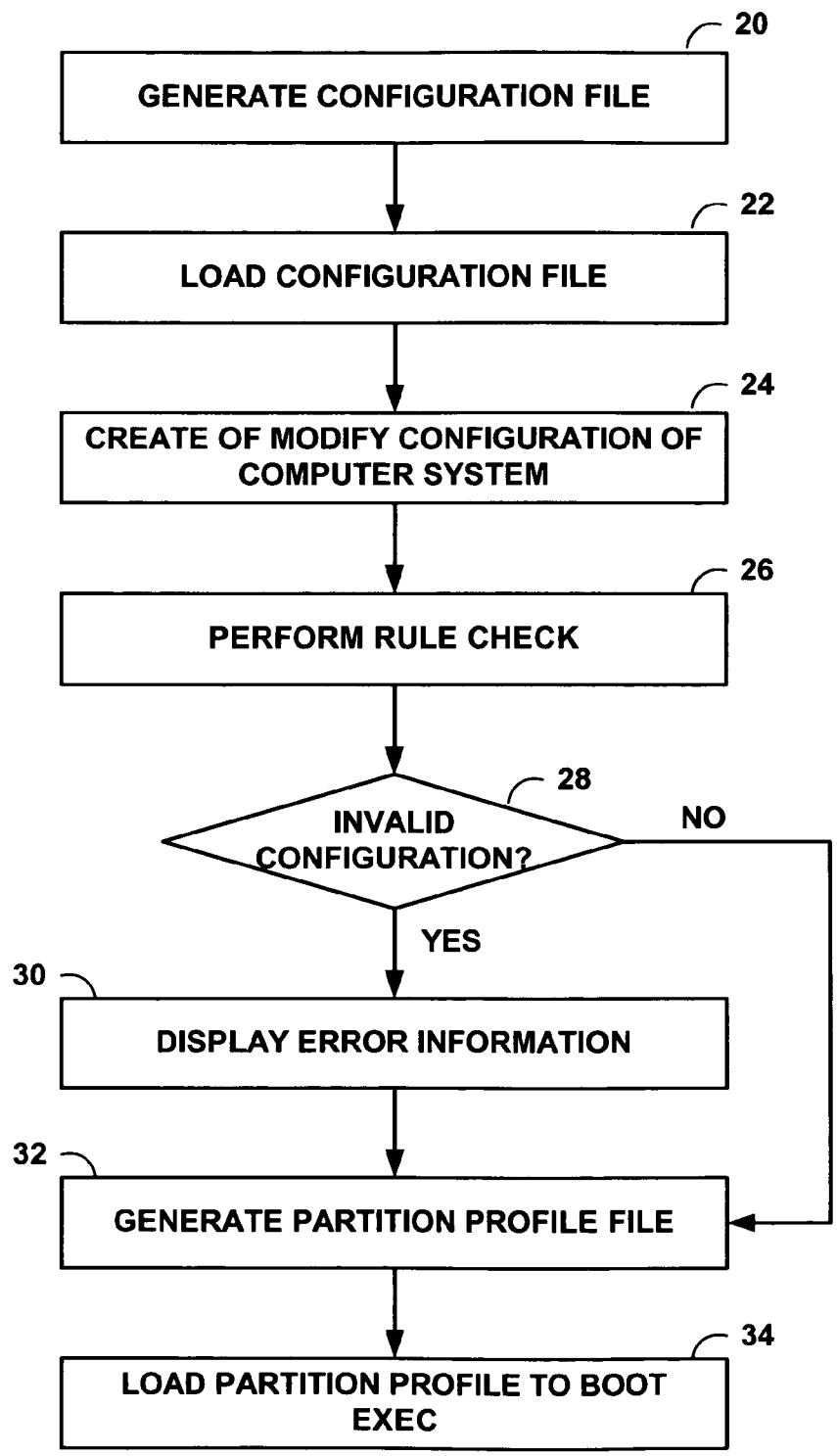
FIG. 2 is a flowchart illustrating exemplary operation of the system for managing the configuration of the computer system.

FIG. 2 is a flowchart illustrating exemplary operation system 2 for managing the configuration of computer system 12. In accordance with the described operation of system 2, users 4 may more efficiently create and modify a configuration for computer system 12. In particular, users 4 may interact with user interfaces of hardware definition program 16 and configuration program 14 to view, create, and a configuration of computer system 12, respectively.

Users 4 may generally be authorized users who remotely manage a configuration for computer system 12. Initially, computer system 12 executes hardware definition program 16 with which users 4 interact to generate HDF 18 (20). In order to generate HDF 18, users 4 may interact with hardware definition program 16 to modify an existing configuration file or create a new configuration file. Since HDF 18 is external to configuration program 14, users 4 may add, modify, or delete configuration rules with affecting the source code of configuration program 14.

In any case, computer system 12 then executes configuration program 14 with which users 4 may interact to load and process HDF 18 (22). Configuration program 14 may be viewed as having an internal validation engine that need not necessarily have any knowledge of hardware components 17 prior to loading HDF 18. However, upon loading HDF 18, configuration program 18 retains all of the configuration information contained in HDF 18. After loading HDF 18, users 4 may interact with configuration program 14 to create or modify a configuration for computer system 12 (24).

During this process, configuration program 14 performs real-time rule checks (26) for each operation users 4 perform. The source code of configuration program 14 includes triggers that invoke one or more rule checks in response to certain operations. A trigger may be associated with a single operation, such as modifying the property of an entity, or multiple operations. The rule check may, for example, correspond to scripts embedded within HDF 16 and associated with the modified entity. In any case, configuration program 14 applies the rule check to determines if the operation results in a valid or invalid configuration (28).

In the case the operation results in an invalid configuration, configuration program 14 displays any error information (30) to users 4 in real-time. In particular, configuration program 14 displays errors to user 14 as users 4 modify the configuration of computer system 12. However, when operations do not result in an invalid configuration, no information is displayed to users 4. Since configuration rules are external to configuration program 14, rule validation is undetectable or transparent to users 4 unless the check does not pass. Thus, system 2 provides real-time rule validation and allows configuration program 14 to inform users 4 that a rule is broken as the user modifies the configuration. Consequently, users may modify a configuration in its entirety without performing a separate verification step since users 4 are notified of errors as they occur. Accordingly, steps 24-30 are iterative as needed, as described. After users 4 have completed modifying the configuration, configuration program 14 generates partition profile file (32) and server control of computer system 12 loads partition profile file to boot EXEC (34).

Figure 3:
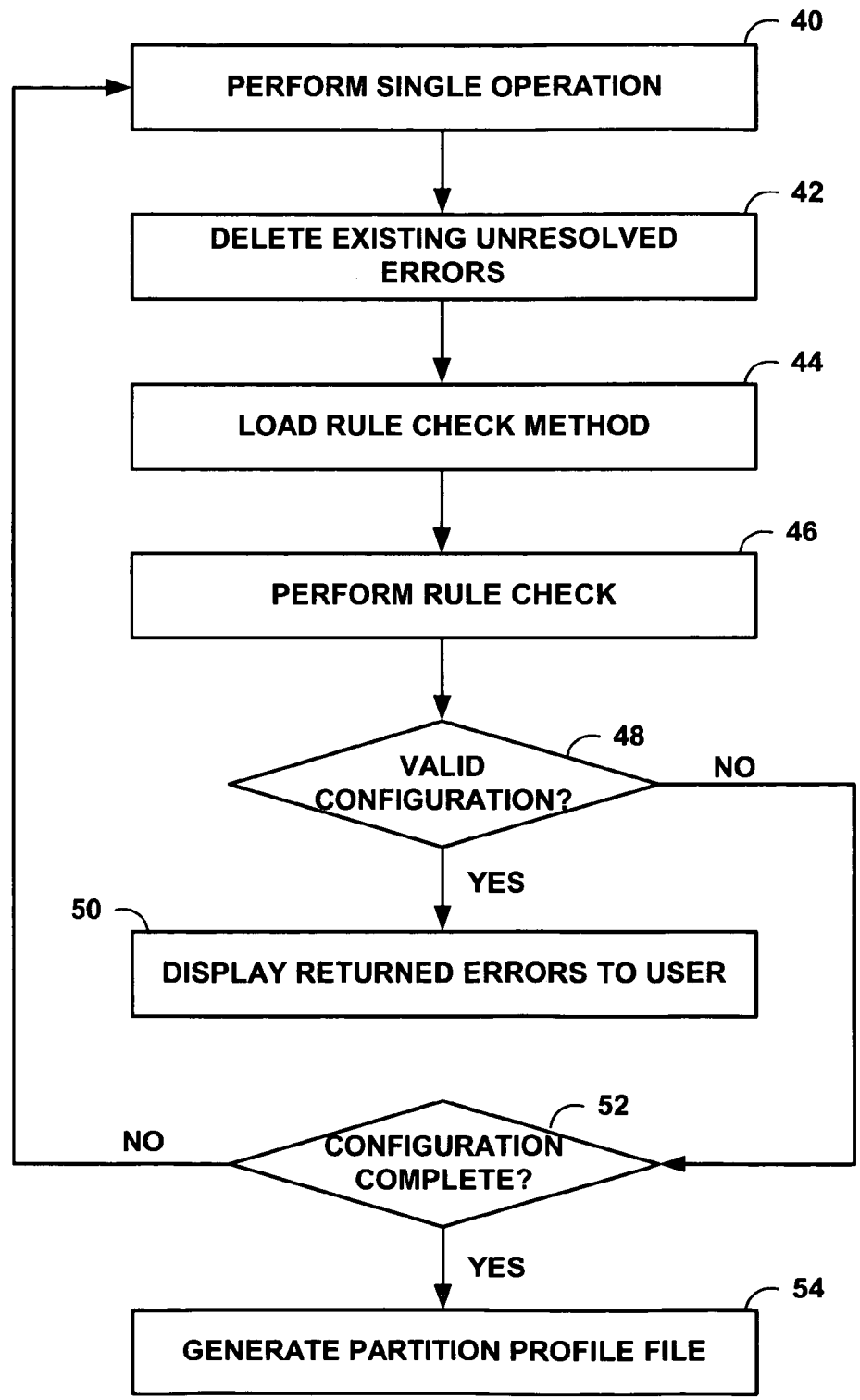
FIG. 3 is a flowchart illustrating exemplary operation of the system for providing real-time management of configuration rules.

FIG. 3 is a flowchart illustrating exemplary operation of system 2 for providing real-time management of configuration rules. In accordance with the described operation of system 2, configuration program 14 can provide real-time management of configuration rules. In particular, since configuration rules are stored externally in HDF 18 and the source code of configuration program 14 includes triggers that invoke rule checks for a single operation, rule validation may be performed in real-time as users 4 modify the configuration rather than performing a separate verification step after modifying a configuration in its entirety.

Again, users 4 may generally be authorized users who remotely manage a configuration for system 12. Initially, a user 4 performs a single operation (40), such as modifying the property of an entity. In response to the operation, configuration program 14 deletes any existing unresolved errors (42), loads a rule check method previously parsed from HDF 18 and stored in memory (44), and performs the rule check (46) to determine if the resulting configuration is valid (48). If the rule check is not already loaded in memory, configuration program 14 loads the rule check from HDF 18 based on the operation. For example, the rule check may comprise a validate script associated with one or more specific configuration parameters and stored within HDF 18 or retained in memory of configuration program 14.

If the resulting configuration is invalid, configuration program 14 displays the returned errors to users 4 (50). Any errors that were deleted in step 42 are reproduced if they have not been addressed. In particular, the displayed information may be based on the value or values returned by the rule check and are displayed to users 4 for each operation performed. When users 4 have completed modifying the configuration (52), configuration program 14 generates partition profile file (54). When the configuration is not complete, user 4 performs another operation and the configuration is similarly checked. Accordingly, steps 40-50 are iterative as needed.

In this manner, rule validation is performed as users 4 modify the configuration of computer system 12 rather than performing wholesale verification, i.e., performing a separate verification step after completing a configuration in its entirety. Since users 4 are notified of errors in real-time, users 4 can fix errors right away without thinking about something else in-between. Furthermore, if users 4 choose to fix errors at a later time, the errors are retained until they are fixed. In any case, users 4 are in complete control of fixing errors.

Figure 4:
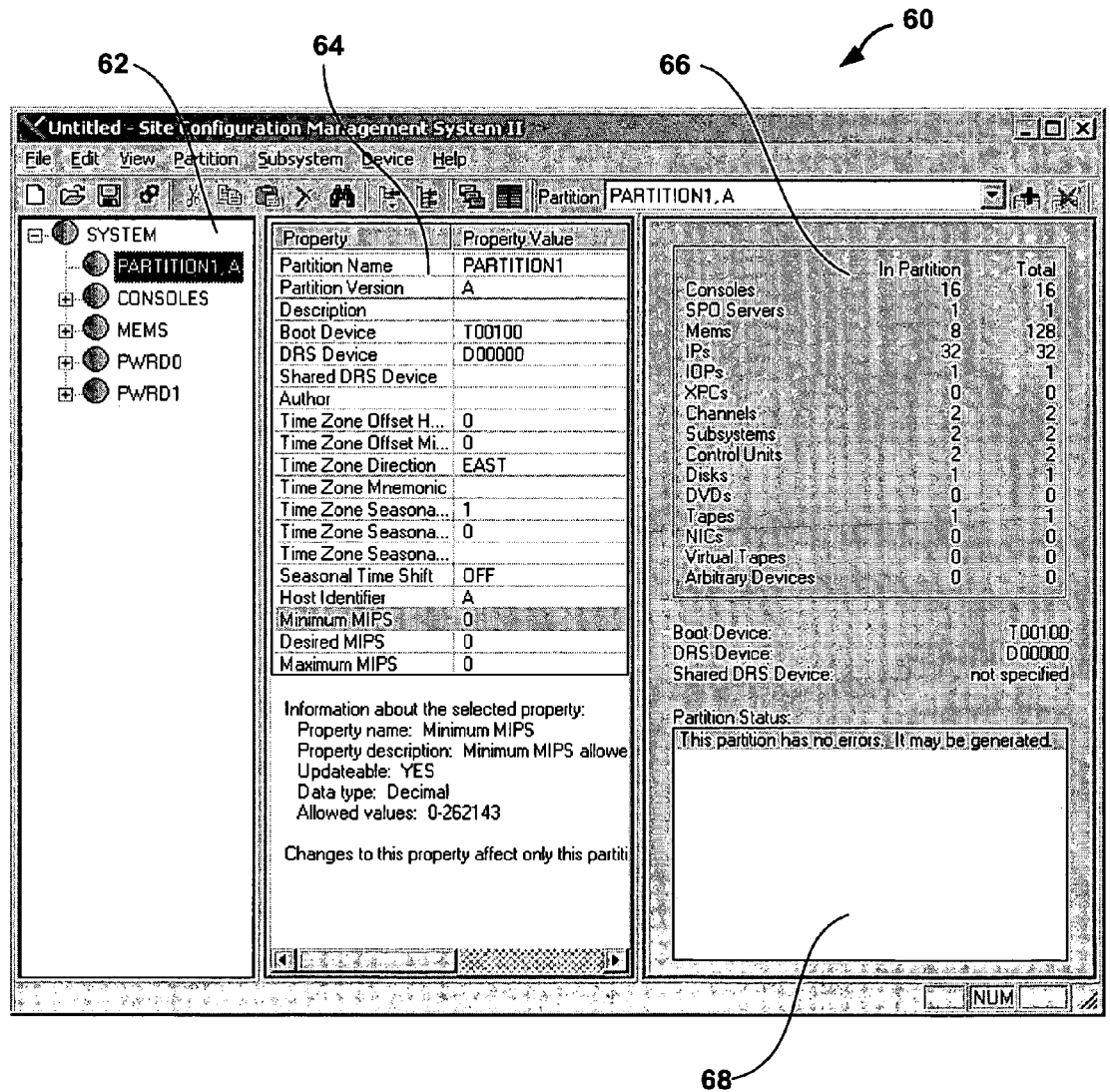
FIGS. 4 and 5 are screen illustrations of an example user interface for managing a configuration of the computer system.
Figure 5:
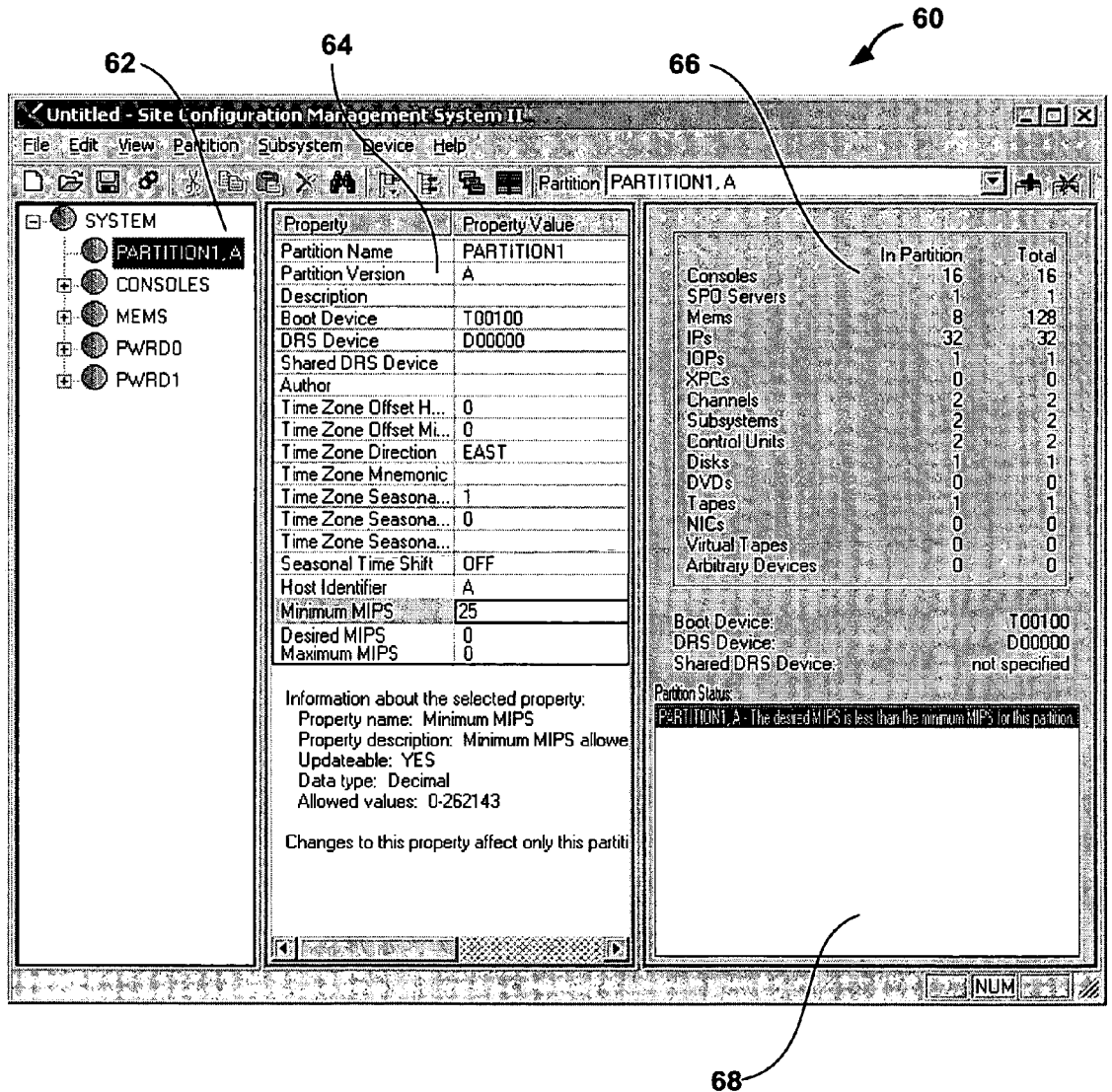

FIGS. 4 and 5 are screen illustrations depicting an example user interface 60 of configuration program 14 with which users 4 interact to manage configuration data for computer system 12. FIG. 4 is a screen illustration depicting an example user interface 60 of configuration program 14, e.g., SCMS II, upon loading HDF 18. In this example, user interface 60 comprises a first portion 62 that visually represents the hierarchical structure for computer system 12, a second portion 64 to display various configuration data properties and their associated values for a component selected from first portion 62, a third portion 66 to display count totals for various hardware components 17 in a partition, and a fourth portion 68 to display the status of the partition and, more particularly, to display messages to users 4 indicating any errors.

User interface 60 generally provides a graphical representation of the hierarchical structure of computer system 12 with which users 4 may interact to view parent/child relationships between various levels of physical and symbolic hardware components. In particular, user interface 60 displays a graphical representation of the hierarchical structure of a specific partition, i.e., "PARTITION1, A" of computer system 12. Users may trace connections between various levels of hardware components 17 and symbolic components by simply expanding and collapsing nodes (illustrated as circles with the hierarchical structure). Accordingly, users 4 may easily traverse the hierarchical structure displayed in first portion 62 and create or modify the property values displayed in second portion 64.

Generally, when a user 4 first logs onto configuration program 14 executing on user interface software module 8, user 4 selects to load HDF 18 via the "File" menu or. "open folder" button located at the top of user interface 60. Upon loading HDF 18, user interface software module 18 generates user interface 60 to include the hierarchical structure in portion 62 and the text information in portions 64, 66, and 68. Configuration program 14 itself need not have any knowledge about hardware components 17, for example, a SCSI2W channel, prior to loading HDF 18. However, upon loading HDF 18, configuration program 14 retains all of the configuration information contained in HDF 18.

In the illustrated example, users 4 have selected "PARTITION1, A" within portion 62. Accordingly, second portion 64 displays various properties and their associated values for "PARTITION1,A". Specifically, portion 64 displays a dual column table that provides a text representation of properties in the left-hand column and the corresponding property values in the right-hand column. Moreover, portion 64 displays user-friendly information about the selected property and property value in a text window located below the dual column table.

Third portion 66 displays a table that provides local and global count information for hardware components 17. In particular, portion 66 displays the number of hardware components of a particular type in "PARTITION1, A" and the total number hardware components of that type that are in the system. Fourth portion 68 displays the "Partition Status" in the lower right-hand portion of user interface 68 and lists all errors in "PARTITION1, A". Currently, "PARTITION1, A" does not have any errors. Accordingly, portion 68 indicates that "PARTITION1, A" may be generated, i.e., a partition profile file may be generated and utilized by server control to boot the operating system.

FIG. 5 is screen illustration depicting example user interface 60 after users 4 have modified the default configuration data. In this example, user 4 has changed the "Minimum MIPS" property from the default value of 0, as shown in FIG. 4, to 25. Upon performing the operation, i.e., pressing the enter key, configuration program 14 triggers or invokes rule checks associated with that operation. In particular, steps 42-50 are triggered.

More specifically, since no errors existed prior to the operation, configuration program 14 need not delete any errors in step 42. In steps 44 and 46, configuration program 14 loads the appropriate embedded script from HDF 18 or, alternatively, from memory, and executes the script to validate the change. The following text provides an exemplary script that may be run in this example. Comments follow the // characters and describe the actions performed by the script. In this example, the script includes statements that detect an invalid configuration result and output an error, as identified by bold font below.

// Create temporary variables needed for validation
TEMP(PARTITION, ' ',ALPHANUMERIC);
TEMP(MIN_MIPS, 0,NUMERIC);
TEMP(MAX_MIPS, 0,NUMERIC);
TEMP(DESIRED_MIPS, 0,NUMERIC);
// Get the current partition name from SCMS II and put
// it in the PARTITION variable
GETCURRENTPARTITION(PARTITION);
// Get the values of the three MIPS properties from SCMS II.
// MAX_MIPS and DESIRED_MIPS will get 0 in this example,
// MIN_MIPS will get 25 since that's what we just changed it to.
GETVARINFOVALUE(MIN_MIPS,PARTITION, 'MIN_MIPS');
GETVARINFOVALUE(MAX_MIPS,PARTITION, 'MAX_MIPS');
GETVARINFOVALUE(DESIRED_MIPS,PARTITION, 'DESIRED_MIPS');
// If MIN_MIPS is greater than MAX_MIPS (in this case it will be
// true)
IF(MIN_MIPS{GT}MAX_MIPS);
// And if MAX_MIPS is greater than 0 (this is not true, so
// no error gets generated here) #IF(MAX_MIPS{GT}0);
  // Generate an error for SCMS II to display #GENERROR('MIN_MAX_MIPS_ERROR', ' ', 'MIN_MIPS');
ENDIF;
ENDIF;
// If the DESIRED_MIPS is less than the MIN_MIPS (in this case this
// is true since DESIRED_MIPS is still 0 and MIN_MIPS is 25) #IF(DESIRED_MIPS{LT}MIN_MIPS);
// Generate an error for SCMS II to display #GENERROR('DESIRED_MIN_MIPS_ERROR', ' ', 'DESIRED_MIPS');
ENDIF;
// If DESIRED_MIPS is greater than MAX_MIPS (not true in this case) #IF(DESIRED_MIPS{GT}MAX_MIPS);
// And if MAX_MIPS is greater than 0 #IF (MAX_MIPS{GT}0);
  // Generate an error for SCMS II to display #GENERROR('DESIRED_MAX_MIPS_ERROR', ' ', 'DESIRED_MIPS');
ENDIF;
ENDIF;

Changing the selected "Minimum MIPS" filed to 25 while leaving the "Desired MIPS" and "Maximum MIPS" fields unchanged generates the error identified in bold in the above exemplary script. The generated error is displayed to users 4 in "Partitions Status" window of portion 68.

Thus, user interface 60 provides real-time rule validation in accordance with the techniques described herein. By providing real-time rule validation, users 4 are notified of errors as they happen rather than after completing a configuration in its entirety. As a result, users 4 can fix errors as they happen and a separate verification step is not required.

Figure 6:
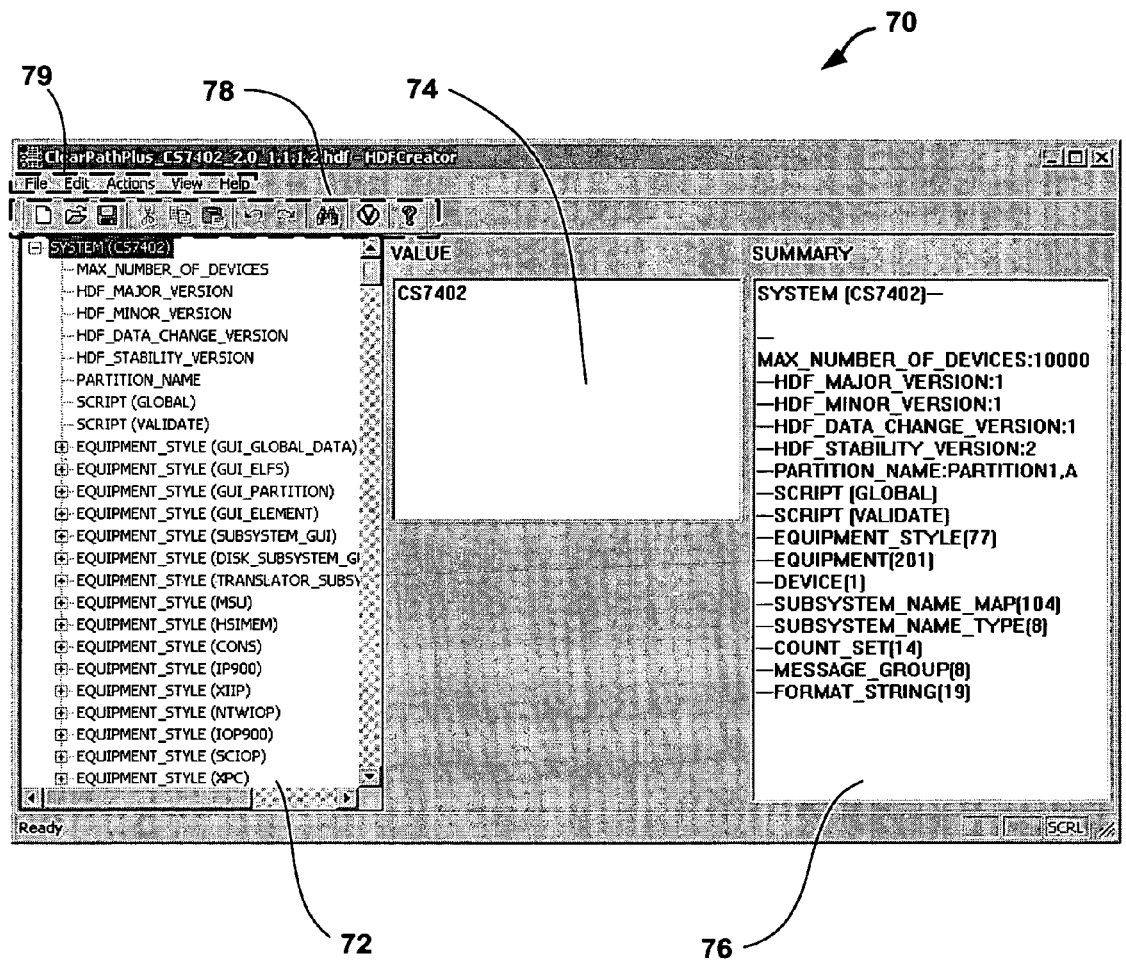

FIG. 6 is a screen illustration depicting an example user interface 70 of hardware definition program 16, e.g. HDF Creator, with which users 4 interact to generate HDF 18 for computer system 12. User interface 70 generally provides a graphical user interface with which users 4 interact to create a correct HDF 18. Before configuration program 14 can load HDF 18, users 4 must generate a correct hardware definition file, i.e., HDF 11 by interacting with hardware definition program 16.

In general, hardware component definitions are made up of eight main components: equipment, equipment styles, devices, subsystem name maps, subsystem name types, count sets, message groups, and format strings. Each of these components defines a different set of properties which performs a specific function in for example, SCMS II, or another configuration program 14.

An equipment component describes a specific kind of hardware such as a type of IOP, channel, subsystem, disk, tape or other hardware component. Equipment components include characteristics describing the equipment such as mnemonic, description, whether or not the equipment can be a boot tape or DRS, and allowed device statuses. Equipment components also define what types of equipment the hardware may be connected to and what types of equipment may be connected to the hardware.

An equipment style component defines a class of equipment. Equipment style components include a set of four basic equipment style characteristics along with the equipment style's data definition and equipment variable sets. These variable sets provide the data necessary to build entries for the device in the partition data bank (PDB). Equipment style components are not necessarily created in a one-to-one ratio with equipment components. For example, if two pieces of equipment have the same equipment mnemonic, both pieces can share an equipment style. Accordingly, a family of tape devices may all have the same equipment mnemonic. In this case, one equipment style can be defined that covers all of the tape devices in the family.

Device components are instances of equipment and map to a specific piece of hardware or, are a place holder for other hardware in the system. Typically, devices are only added within SCMS II. However, the top-level "system" device must be created in the HDF 18 in order to give SCMS II a starting point to create a configuration for computer system 12. The GUI_GLOBAL_DATA device exists in each HDF generated by HDF Creator to serve this purpose.

Subsystem name maps serve to provide a mapping between the SCMS and SCMS II names for a subsystem. For example, when an SCMS export file is being imported by SCMS II, the subsystem name map is used to match an SCMS subsystem with the appropriate SCMS II subsystem and configure it appropriately.

Subsystem name types are also crucial for the import process. Certain SCMS subsystems require special handling when they are imported into SCMS II. These subsystems fall into eight different groupings or types. Each subsystem name type includes a list of SCMS subsystems that are of the type being defined. Subsystem name types exist for specific existing subsystems and should never need to be added or modified.

A count set component defines a group of equipment for SCMS II to count. SCMS II maintains and displays tallies of the number devices that are contained in a user-specified set. For example, a user may want to track how many IOPs are in computer system 12. However, in order for SCMS II to know what types of equipment are IOPs, a count set must be defined in HDF 18 listing those equipment names.

Message group components provide SCMS II with the default message group names and the list of each group's possible EXEC message classes. For example, the message group component, SYSMSG, may contain the classes AUDIT-TRAIL, CKPT-RESTART, COMMON-BANK, MISCELLANEOUS, RUN-STATUS, SECURITY, TIP, and TU. These lists are defined by the EXEC and should not be changed in HDF 18. Within SCMS II, users 4 may remove message classes from a group.

Format string components are the equivalent of a global text string for HDF 18. Format strings are most commonly used to explain the execution results of a hardware definition script to SCMS II. A format string is visible to all scripts at any time.

In order for HDF 18 to be loaded by SCMS II, HDF may be required to contain a standard set of components. The following table, Table 1, lists the required components and their characteristics.

TABLE 1

| Component Type | Component Name |
| --- | --- |
| Equipment Styles | GUI_GLOBAL_DATA |
| | GUI_ELFS |
| | GUI_PARTITION |
| | GUI_ELEMENT |
| | SUBSYSTEM_GUI |
| | DISK_SUBSYSTEM_GUI |
| | TRANSLATOR_SUBSYSTEM_GUI |
| | MSU |
| | HSIMEM |
| | CONS |
| | IP900 |
| Equipment | GUI_GLOBAL_DATA |
| | MEM_GUI |
| | CONS_GUI |
| | SPO_GUI |
| | MEM |
| | CONS |
| | SPO-SERVER |
| | IP |
| Devices | GUI_GLOBAL_DATA |
| Message Groups | All existing message groups |
| Format Strings | All existing format strings |

Hardware definition scripts embedded within HDF 16 may include a global and a validate script. In addition, specific script routines may exist in equipment and equipment style components. Generally, the global and validate scripts exist to organize variables and macros that are used by multiple equipment or equipment style scripts. The global script is a container for script macros that are used in multiple components throughout the hardware definition and generally support the device structure and naming. In particular, the global script may allow users to configure devices with multiple upward connections. The validate script verifies that a valid system configuration exists for a given partition and is initiated by SCMS II whenever a partition is updated or a partition file is generated. Validate operations are also executed in order to check for invalid system configurations as users 4 modify a configuration, as previously described in FIG. 3.

In the illustrated example, user interface 70 includes a first portion 72 that includes a hierarchical structure that visually represents the contents of HDF 18, i.e., hardware definition components and hardware definition scripts, for computer system 12. User interface 70 also includes a second portion 74 that provides an interface to edit the hardware definition or script selected in first portion 72. Portion 74 may include a drop-down menu (not shown) from which users 4 may select one or more characteristics or values associated with a component selected in portion 74. User interface 70 further includes a third portion 76 that provides an interface to display a text description property values for the hardware definition component or script selected in first portion 72.

In particular, user interface 70 displays a hierarchical structure of a specific hardware definition in portion 72. More specifically, the first root item in the hierarchical structure, i.e., SYSTEM, represents the complete hardware definition. The value of SYSTEM is the name of the hardware definition. Listed directly below the expanded SYSTEM node are six hardware definition properties: MAX_NUMBER_OF_DEVICES, HDF_MAJOR_VERSION, HDF_MINOR_VERSION, HDF_DATA_CHANGE_VERSION, HDF_STABILITY_VERSION, and PARTITION_NAME. The version values are not modifiable, and the MAX_NUMBER_OF_DEVICES and PARTITION_NAME values should never change.

This MAX_NUMBER_OF_DEVICES field specifies the maximum number of devices that may be created in the hardware definition. SCMS II will not allow devices to be added after the device count for system configuration has reached this value. The HDF_MAJOR_VERSION field must be equal to the SCMS II major version. The HDF_MINOR_VERSION field must be equal to the SCMS II minor version. The HDF_DATA_CHANGE_VERSION field is incremented each time the HDF Creator application is changed. Adding equipment or equipment style characteristics are examples of this type of change. Adding equipment components or changing the values of existing properties are not considered structure changes. The HDF_STABILITY_VERSION field is incremented each time there is a change to a hardware definition file that does not affect its structure within a major/minor version.

SCMS II checks the HDF_MAJOR_VERSION, HDF_MINOR_VERSION, and HDF_DATA_CHANGE_VERSION for compatibility when HDF 18 is loaded. If these values do not correspond with the version of SCMS II being used, HDF 18 cannot be loaded. In order to prevent compatibility issues, HDF version number should not be modified.

The PARTITION_NAME field holds the name and version of the default partition of computer system 12. SCMS II creates one partition. In this example, the PARTITION_NAME field must be in the format PARTITION,VERSION, where the partition name and version are alphanumeric strings between 1 and 12 characters long.

The global and validate scripts follow the hardware definition properties. The global script is a container for script macros that are used in multiple components throughout the hardware definition. These scripts for the most part support the device structure and naming. The validate script is initiated by SCMS II whenever a partition is updated or a partition file is generated. The validate script verifies that a valid system configuration exists for a given partition. The global and validate scripts are discussed in greater detail in FIG. 5.

The remainder of the hierarchical structure in portion 62 includes of a listing of the hardware definition components in the default order equipment styles, equipment, devices, count sets, message groups, and format strings.

Hardware definition components are added and deleted by means of context menus in portion 72. For example, to add a component, users 4 may, for example, cause portion 72 to present a context-sensitive shortcut menu with related configuration tasks, such as an "add" operation, by selecting the SYSTEM item or an existing component of the same type via a "right mouse click". Users 4 may then simply select the desired component's add operation. Users 4 may, in a similar fashion, delete an existing component by selecting the appropriate item on the hierarchical structure via a right mouse click, and selecting the delete operation from the shortcut menu. After a component is inserted in the tree, its characteristics must be set, which is described in detail below. Users 4 may also delete an existing component by select the component and pressing the Delete key.

Existing components may also be moved or copied in the tree. To move a component, drag the component to its new location or right click the component, select Cut from tool bar menu 78, right click the component at the new location, and select Paste from menu 78. To copy a component, right click the component to be copied, select Copy from the menu, right click the component at the new location, and select Paste from the menu. A new component with identical characteristics as the original component is inserted into the tree.

Portion 74 is located in the middle of graphical user interface 70 and includes one or more user-editable fields, each of which provides a means to change component properties and scripts. Portion 74 is updated each time a new item is selected in portion 72.

Portion 76 is located at the right side of graphical user interface 70 and displays properties and associated values for the component currently selected in portion 72. Portion 72 is updated each time a new component is selected in portion 72.

Graphical user interface 70 also includes toolbar 79 from which users 4 may select standard file menu operations, standard edit menu operations, actions menu operations, standard view menu operations, and standard help menu operations. In the interest of brevity, the standard file, edit, view, and help menu operations are not described herein. However, the actions menu operations are briefly described below because selecting Actions →Validate causes HDF Creator to validate that the configuration is valid. In particular, selecting Actions→Validate causes HDF creator to confirm the following:

All component names are unique except subsystem name maps and count sets.
Minimum characteristics must be less than or equal to their corresponding maximum characteristics.
Each equipment contains a valid equipment style name in the MNEMONIC field.
Each equipment specified as a parent points to its child equipment.
Each equipment specified as a child points to its parent equipment.
Each equipment name listed in a count set corresponds to an existing equipment component.
Each device contains a valid equipment name in the EQUIPMENT_NAME field.
An equipment style mnemonic is six characters or less unless it is of the class GUI_ELEMENT.
Each variable name is unique.
If a variable's APPEARS_IN_GUI value is set to FALSE, then its UPDATEABLE value is set to FALSE.
A variable's default value must be of the variable's data type and within its allowed values.
If a variable has a WORD_LOCATION set, then its SIZE_IN_WORDS equals one.
The first bit of a variable's WORD_LOCATION is less than or equal to the second bit, and both bits are in the range 0 to 35.
If a variable's WORD_LOCATION is specified and PARTIAL_WORD_FOLLOWS is set to TRUE, then the next variable in the variable set must have a WORD_LOCATION specified. This must continue until a variable in the variable set has a PARTIAL_WORD_FOLLOWS value of FALSE. A variable with PARTIAL_WORD_FOLLOWS set to FALSE must exist in this variable set in order to terminate the use of partial word addressing.
If a variable does not have a WORD_LOCATION set, then its PARTIAL_WORD_FOLLOWS value is FALSE.

If any of the previously listed conditions are not met for an equipment component, an error message is displayed to users 4 within portion 76 explaining the problem. In some embodiments, the error message may be displayed as a separate message dialog, not in portion 76. Further, user interface 70 may highlight the offending location in the tree. However, if the configuration is valid, a message is displayed to users 4 indicating HDF 18 was validated successfully, and HDF 18 is generated. In general, the validate operation should be performed on an HDF before it is loaded in SCMS II.

FIGS. 7-17 are screen illustrations depicting the characteristics for various component types within the hierarchical structure displayed in portion 72. More specifically, FIGS. 7-17 are screen illustrations depicting a select area of the hierarchical structure displayed in portion 72 corresponding to a particular hardware definition component. As described previously, a hardware definition component comprises groupings of eight different component types, i.e., equipment styles, equipment, devices, subsystem name maps, subsystem name types, count sets, format strings, and message groups. Each of these components has different characteristics. After a component is added to a hardware definition, its characteristics must be set appropriately since configuration program 14 has no prior knowledge of hardware components 17 prior to loading HDF 18. Accordingly, FIGS. 7-17 describe these characteristics and how these characteristics should be configured using HDF Creator in order to generate HDF 18 for use by SCMS II. Thus, the descriptions for FIGS. 7-17 make reference to HDF Creator and SCMS II rather than generally referring to hardware definition program 16 and configuration program 14, respectively. However, FIGS. 7-17 should not be considered limiting, but rather to serve merely as examples to illustrate how users 4 may interact with a hardware definition program 16 to generate HDF 18 which is used by configuration program 14 to specify a configuration for computer system 12.

Figure 7:
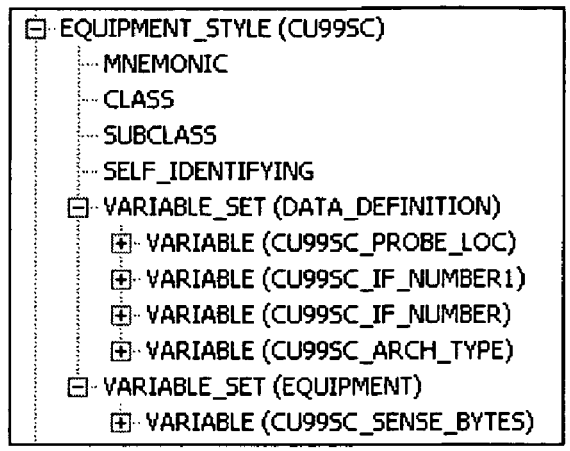

FIG. 7 is a screen illustration depicting equipment style characteristics. An equipment style defines a class of equipment. Equipment style components include a set of four basic equipment style characteristics, i.e. MNEMONIC, CLASS, SUBCLASS, and SELF_IDENTIFYING, along with the equipment style's data definition and equipment variable sets. The MNEMONIC field contains the equipment style's OS2200 EXEC mnemonic. This is an alphanumeric value that is up to six characters in length. The mnemonic also serves as the identifier for the equipment style in HDF Creator. The CLASS field includes the class or type of equipment style being added. Equipment styles are of the class GUI_ELEMENT, IP, IOP, CHANNEL, CONTROL_UNIT, DEVICE, MEMORY, XIIP, or XPC. The equipment style class is selected from a drop-down list in portion 74.

GUI_ELEMENT's are devices that appear in the SCMS II user interface but do not appear in a partition data bank (PDB). These devices are typically used as placeholders for groupings of child devices.

The SUBCLASS field contains the subclass of the equipment style being added. Equipment styles are of the subclass NETWORK, CONSOLE, or NONE. If the equipment style is not for a console or network device, the subclass is always NONE. The equipment style subclass is selected from a drop-down list in portion 64.

SELF_IDENTIFYING is a flag in the PDB which indicates whether or not equipment of this equipment style can be detected automatically by the EXEC. If this is the case, TRUE should be selected from the drop-down in portion 64. Otherwise, FALSE should be selected. In normal cases, SELF_IDENTIFYING is set to FALSE.

VARIABLE_SET (DATA_DEFINITION) and VARAIBLE_SET (EQUIPMENT) include the equipment style's equipment and data definition variables. Variables are described in greater in FIG. 8. When initializing variable sets for GUI ELEMENT equipment styles, the handler data version should be set in portion 72. If the equipment style is GUI ELEMENT, the version value may be left blank.

Figure 8:
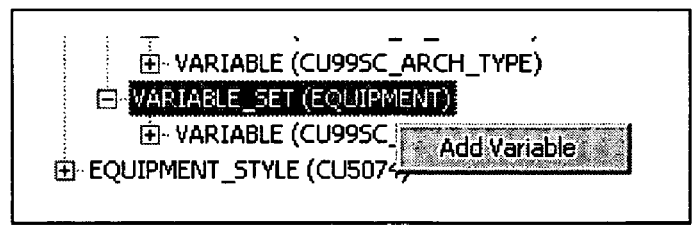

FIG. 8 is a screen illustration depicting a method for adding a new variable to variable VARIABLE—SET (EQUIPMENT) of FIG. 7. To add a new variable to an equipment style, right click on VARIABLE_SET (DATA_DEFINITION) or VARIABLE_SET (EQUIPMENT), depending on which case applies, and select "Add Variable". The variable is inserted into the hierarchical structure and the variable characteristics can be set. Variables must be listed in the same order in the variable set as they appear in the PDB.

Equipment style variables store information about certain properties of an equipment style. These variables are grouped into two different sets, i.e., data definition variables and equipment variables. Equipment style variables contain the information necessary to build the entry for an equipment style in the equipment section of the PDB. These variables describe properties such as sense bytes, timeout values, and fault log. Data definition variables are primarily used to build the equipment style's entry in the PDB's component section. However, some data definition variables define equipment style related properties in the partition profile and in SCMS II. These variables describe properties such as interface number, probe locations, and architecture types.

FIG. 9 is a screen illustration depicting variable characteristics for variable VARIABLE (CU99SC_SENSE_BYTES) of FIG. 6. Variable characteristics, sometimes referred to as variable info, are set for each variable in an equipment style. Data definition and equipment variables share the same set of characteristics.

The IDENTIFIER characteristic is the name of the variable. The identifier consists of two different parts: the equipment style mnemonic and the variable name. The mnemonic and name are separated by an underscore character. In FIG. 9, the variable's mnemonic is "CU99SC" and the name is "SENSE_BYTES". Variable names must be unique across all variables in the system. The variable's type is specified by the DATA_TYPE characteristic. The supported data types are ENUMERATION, BOOLEAN, STRING, TIMEZONE_OFFSET, OCTAL, DECIMAL, and HEXADECIMAL. The variable data type is selected from a drop-down list in the portion 74 of user interface 70.

The ENUMERATION data type is used when a user-friendly string needs to be attached to a numeric value. For example, when a variable has the allowed values 1 and 2 where 1 implies TRUE and 2 implies FALSE. By specifying the variable as an enumeration, all references to its value from the SCMS II user interface appear as TRUE/FALSE, but the variable's value in the PDB is set to 1 or 2. The TIMEZONE_OFFSET is the number of seconds the time zone is offset from Greenwich Mean Time (GMT). SCMS II converts TIMEZONE_OFFSET variables to hours: minutes: seconds format before displaying them.

The DISPLAY_NAME characteristic is a user-friendly name that SCMS II displays when referencing the variable. For example, instead of using the identifier, "CU99SC_SENSE_BYTES", SCMS II displays the friendly name "Sense Bytes".

The DESCRIPTION CHARCTERISTIC is a textual description of the variable. The SCOPE characteristic indicates the scope of value updates for the variable. Variables can be updated on three different levels: system, partition, and connection. The variable scope is selected from a drop-down list in the portion 74.

When a variable with system scope is updated for a device, the change is global for the device across all upward connections and partitions. When a variable with partition scope is updated for a device, the change is applied for the device only in the active partition. The same device in a different partition retains the old variable value.

Finally, when a variable with connection scope is updated for a device, the change is applied for the device only beneath a given parent. For example, in a two partition system in which a first and a second device is available to both partitions, the first and second device may both be parents to a child device. Thus, the child device has two upwards connections. Assume SENSE_BYTES is a variable within the child device having connection scope. If the SCMS II user accesses the child device through the first parent device in only one of the partitions and changes the value of SENSE_BYTES from 0 to 1, SENSE_BYTES equals 1 when the child device is accessed via the first device in both partitions, but SENSE_BYTES equals 0 when the child device is accessed by the second parent in either partition.

SIZE_IN_WORDS characteristic is the variable's size in 36-bit 2200 words. The SIZE_IN_WORDS must correspond to the space allocated in the PDB for this variable. The UPDATEABLE characteristic indicates whether or not SCMS II users should be allowed to modify this variable's value. If the variable is updateable, select TRUE from the drop-down in portion 74, otherwise, select FALSE.

The APPEARS_IN_GUI characteristic indicates whether or not the variable is visible to user 4. Typically, a variable is not displayed in SCMS II in cases where it is not updateable and has no intuitive meaning to the user. If the variable should always appear in the SCMS II user interface, select ALWAYS from the drop-down menu in the portion 74. If it should never appear, select NEVER from the drop-down menu, and if the variable should appear only when it has more than one allowed value, select IF_CHOICES from the drop-down menu.

The APPEARS_IN_PDB characteristic indicates whether or not the variable is part of the PDB. All equipment variables and some device data variables appear in the PDB. If the variable should appear in the PDB, select TRUE from the drop-down in the value view; otherwise, select FALSE.

The DEFAULT_VALUE characteristic is the variable's initial value. This value must be of the variable's data type (ENUMERATION, BOOLEAN, STRING, TIMEZONE_OFFSET, OCTAL, DECIMAL, or HEXADECIMAL) and fall within the variable's allowed values (discussed below). DEFAULT_VALUE may be left blank.

The VALUE_SOURCE characteristic is the source of the variable's allowed values. The possible VALUE_SOURCE's are USER, PARENT_MNEMONIC, DISK_NAMES, and SPO_NAMES. If USER is selected, SCMS II uses the allowed values set by the user in HDF Creator. Most variables have a VALUE_SOURCE of USER. If PARENT_MNEMONIC is selected, the only value allowed is the device parent's mnemonic. If DISK_NAMES is selected, the allowed values are the names of each disk in the system that can be duplexed with the selected disk. This VALUE_SOURCE is used to present a list of disks to users 4 in order for them to duplex a pair of disks. If SPO_NAMES is selected, the allowed values are the names of each SPO server in the system that is not already mapped to the selected console. This VALUE_SOURCE is used to present a list of SPO servers to SCMS II users in order for them to configure consoles.

The ALLOWED_VALUES characteristic specifies the potential values the variable may be set to. The ALLOWED_VALUES must be of the variable's data type. ALLOWED_VALUES should only be set if the VALUE_SOURCE is USER. A range of numeric values may be specified in the forms '1-10', '1, 3, 5, 7', or '1-6, 7-15'. When specifying a range, the minimum value must precede the maximum value. For example, the range '5-2' is not allowed.

A variable's STRING_TYPE characteristic, LJSF (left justified, space filled) or NULL_TERMINATED, is determined by the PDB's requirement for the variable. If the variable is not a string, the STRING_TYPE is irrelevant. Select LJSF or NULL_TERMINATED from the drop-down in the portion 74.

The STRING_RESTRICT_TYPE characteristic specifies the characters allowed in a string variable. Choices for the STRING_RESTRICT_TYPE are NO_RESTRICT (no restriction), ALPHANUMERIC (A through Z and 0 through 9), ALPHANUMERIC_WITH_SYMBOLS (A through Z, 0 through 9, and # . / \ + & − and "), and ALPHANUMERIC_DASH (A through Z, 0 through 9, and −). If the variable is not a string, the STRING_RESTRICT_TYPE is irrelevant. Select the STRING_RESTRICT_TYPE from the drop-down in portion 74.

The MIN_CHARS characteristic is the minimum length of a string variable. If the variable is not a string or there is no minimum restriction, this value may be left blank. The MAX_CHARS characteristic is the maximum length of a string variable. If the variable is not a string or there is no maximum restriction, this value may be left blank. The MIRROR_TYPE characteristic provides the ability to link this variable's value to that of the corresponding variable in a child device. For example, CU001 may have a variable CUDSCS_SHARED. CUDSCS_SHARED's value is TRUE, and its MIRROR_TYPE is SHARED. Only devices with the variable CUDSCS_SHARED's value equal to TRUE may be connected to this device. New devices may then be added with CUDSCS_SHARED's value automatically set to TRUE, and any attempt to connect a device with CUDSCS_SHARED's value set to FALSE is rejected by SCMS II. An update to a mirrored variable is made uniformly across all devices containing the same MIRROR_TYPE characteristic. To set a variable's MIRROR_TYPE, remove the mnemonic from the variable's identifier and type this value into the value view's text field.

The WORD_LOCATION characteristic specifies the range of bits where the variable value is to be located in a 2200 word in the PDB. In the example below the variable's word location is 4-12. The variable value is set at this location, and the remaining bits in the word are left unchanged. If a word location is not specified, the value starts at bit zero. The PARTIAL_WORD_FOLLOWS characteristic indicates whether or not another variable value follows this variable in the same 2200 word.

In some scenarios, a word in the PDB may contain two or more variable values. For example, a 2200 word may include values for variables VAR1 and VAR2. VAR1's word location is bits 0-8, and VAR2's word location is bits 9-16. In this case, the partial word value VAR2 follows VAR1, so for VAR1 PARTIAL_WORD_FOLLOWS must be set to TRUE. No variable value follows VAR2 in this word, so its PARTIAL_WORD_FOLLOWS is set to FALSE. If a 2200 word contains only one variable, PARTIAL_WORD_FOLLOWS is always set to FALSE.

The script SET_VARIABLE provides an interface to set a variable's value from the equipment scripts instead of strictly from the SCMS II user interface. This script takes the variable's value and allowed values from the hardware definition device structure and sets it in the SCMS II data structure. SET_VARIABLE scripts are required only for variables that may be set by scripts. When required, SET_VARIABLE scripts follow a standard format. The following is an example of such a standard format script. Scripts are described in greater detail in FIG. 18. Comments follow the // characters and describe what action the script is doing.

```
#TEMP(CUDSCS_IF_NUMBER1,'         ',ALPHANUMERIC);
#TEMP(NAME,'CUDSCS_IF_NUMBER1',ALPHANUMERIC);
#TEMP(ITER,0,NUMERIC);
#TEMP(NUM_VARIABLES,0,NUMERIC);
// Locate the devices variable set in the device name
#GETSIZE(VARIABLESET.VS,NUM_VARIABLES);
#WHILE(ITER{LT}NUM_VARIABLES);
#IF(NAME{E}VARIABLESET.VS[ITER].NAME);
// Set the value of the variable
#SET(CUDSCS_IF_NUMBER1,VARIABLESET.VS[ITER].VALUE);
// Set the allowed values for the variable
#FORMAT(VARIABLESET.VS[ITER].ALLOWED_VALUES);
#BREAK;
#ENDIF;
#ADD(ITER,1);
#ENDWHILE;
```

FIG. 10 is a screen illustration depicting equipment characteristics for the equipment type EQUIPMENT (DLT7000-TAPE). In general, an equipment component describes a specific type of hardware such as a type of IOP, channel, subsystem, disk, tape, or other type of hardware. Equipment components contain characteristics that describe the equipment and define what types of equipment devices of this equipment type may be connected to and may have connected to them.

The EQUIPMENT_NAME characteristic is the equipment component's identifier. The MNEMONIC characteristic is the 2200 EXEC equipment mnemonic. There must be a corresponding equipment style component for any mnemonic referenced in an equipment component. The FRIENDLY_NAME characteristic is an alternate name for the equipment component. This is used to provide a more meaningful equipment name to user 4. The DESCRIPTION characteristic is an open text string used to describe the equipment. If no description is necessary, this field may be left blank. The NOTES characteristic provides a supplemental equipment description. As a rule the DESCRIPTION characteristic provides a general description of the equipment, and the NOTES characteristic discuss specific connection rules or other details about the equipment. This field may be left blank. The MIN_PARENT_LIST characteristic specifies the minimum number of parents that devices of this equipment type may have and may store a numeric value 0 through n. The MAX_PARENT_LIST characteristic specifies the maximum number of parents that devices of this equipment type may have and stores a numeric value 0 through n. SCMS II does not allow a device other than the root device to not have at least one parent. The MIN_CHILD_INST characteristic specifies the minimum number of children that devices of this equipment type may have and stores a numeric value 0 through n. The MAX_CHILD_INST characteristic specifies the maximum number of children that devices of this equipment type may have and stores a numeric value 0 through n. The DEVICE_NAME_EDITABLE characteristic indicates whether or not devices of this equipment type may be renamed by user 4 in SCMS II. If devices may be renamed, select TRUE from the drop down in portion 74, otherwise, select FALSE. The ALLOW_REMOVE characteristic indicates whether or not devices of this equipment type may be deleted or moved to a new location in the system configuration. If ALLOW_REMOVE is set to TRUE, devices of this equipment type may be cut, copied, pasted, and deleted in SCMS II. To set ALLOW_REMOVE, select TRUE or FALSE from the drop-down in the value view. The ALLOW_CONNECTIONS characteristic indicates whether or not devices of this equipment type may have child devices connected to them. If children can be connected, select TRUE from the drop-down in portion 74, otherwise, select FALSE. The ALLOW_DRS_DEVICE characteristic indicates whether or not a device of this equipment type may be designated as the system configuration's DRS device. If this is the case, select TRUE from the drop-down in portion 74, otherwise, select FALSE. The ALLOW_BOOT_DEVICE characteristic indicates whether or not a device of this equipment type may be designated as the system configuration's boot device. If this is the case, select TRUE from the drop-down in portion 74, otherwise, select FALSE. The ALLOW_SUSPEND characteristic indicates whether or not a device of this equipment type may have a status of suspended. If this is the case, select TRUE from the drop-down in portion 74, otherwise, select FALSE. The ALLOW_RESERVE characteristic indicates whether or not a device of this equipment type may have a status of reserved. If this is the case, select TRUE from the drop-down in portion 74, otherwise, select FALSE. The EQUIP_APPEARS_IN_GUI characteristic indicates whether or not SCMS II should display devices of this equipment type in user interface 70. In some cases in which devices cannot be modified, it may be beneficial to hide the devices from users 4. However, if devices of this equipment type should be displayed in SCMS II, select TRUE from the drop-down in portion 74, otherwise, select FALSE. If devices are hidden in SCMS II, their child devices are also hidden. If the MIRROR_PARENT_DEVICE_STATUS characteristic is set to TRUE, devices of this equipment type are forced to always have the same device status, e.g., UP, DOWN, RESERVED, or SUSPENDED, and include in partition state a value of TRUE or FALSE as their parents. The DEFAULT_NAME script creates a default name for a new device of this equipment type. The default name script takes on one of two different forms depending on the type of equipment.

All non-subsystem and non-subsystem member devices, such as IOP's, channels, and network devices, are named by retrieving a previously generated name from the device structure. The implementation of the device structure is discussed in further detail in FIG. 18. The following is the default name script for a non-subsystem/non-subsystem member device. The FIND_SLOT macro in line 3 locates the device's corresponding position in the device structure and sets its default name.

1. #EXECUTE(CREATE_COMMON_VARIABLES);
2. #EXECUTE(CREATE_IOP_VARIABLES);
3. #EXECUTE(FIND_SLOT);
4. #LOCAL(IOPINST,INST,NUMERIC);

Subsystems and subsystem members, for example, control units and peripheral devices, are not stored in the device structure. Rather, subsystems and subsystem members are named as they are added. In particular, names of these devices are created sequentially using the device counts. The following is the default name script for a subsystem. The GET_NEXT_SUBSYS_ID macro of line 4 determines the number of the subsystem. For example, if there are six subsystems in the system, the new subsystem is number seven. SUBSYS_ID is used as the unique identifier in the subsystem name which is generated by line 5.

1. #EXECUTE(CREATE_COMMON_VARIABLES);
2. #EXECUTE(CREATE_SUBSYS_VARIABLES);
3. #EXECUTE(FIND_SLOT);
4. #EXECUTE(GET_NEXT_SUBSYS_ID);
5. #FORMAT('UMD5200-SUBSYS-[%S]',SUBSYS_ID);
6. #GENSTRING(PARENT::PARENT.DNS[SLOT].DN[ITER2].DEFAULTNAME, 'UMD5200-SUBSYS-[%S]', SUBSYS_ID);
7. #SET(SUBSYS_NAME,PARENT::PARENT.DNS[SLOT].DN[ITER2]. DEFAULTNAME);

Control unit and device names are generated in a similar manner. In the script below, both the subsystem ID and the control unit ID are used to create a unique control unit name in line 2. This script initializes the device variable "CU5074_IF_NUMBER".

1. #EXECUTE(CREATE_DEVICE_VARIABLES);
2. #FORMAT('C[%03S][%02S]',SUBSYS_ID,NEXT_CU_ID);
3. #SETSIZE(VARIABLESET.VS,1);
4. #SET(VARIABLESET.VS[0].NAME, 'CU5074_IF_NUMBER');
5. #SET(VARIABLESET.VS[0].ALLOWED_VALUES, '0-15');
6. #SET(VARIABLESET.VS[0].VALUE,'0');
7. #ADDALPHASTRING(NEXT_CU_ID,1);

The CAN_CONNECT script checks whether or not the device may be connected to a new parent. The purpose of the CAN_CONNECT script is to provide supplemental error checking that may not be covered by the data structure of SCMS II. A number of devices in the hardware definitions do not require a CAN_CONNECT script. The REFRESH script is a standard script that regenerates the default name of the device and is provided below. In some cases, when a device is moved to a new location in SCMS II, a default name change is necessary. This script should may not change and is only required for devices that are named using the device structure.

1. #EXECUTE(CREATE_REFRESH_VARIABLES);
2. #EXECUTE(RETRIEVE_DEFAULT_NAME);
3. #EXECUTE(NIOP);

The ON_CONNECT script connects the current device to a new parent. ON_CONNECT scripts maintain the device structure and the device counts. The following is a standard ON_CONNECT script format.

1. #EXECUTE(CREATE_CONNECT_VARIABLES);
2. #EXECUTE(CONNECT_TO_PARENT);
3. #IF(NUMPARENTS{GT}0);
4. #SET(CURRENTPARENT::PARENT.DNS[SLOT].USEDEFAULT,0);
5. #ELSE;
6. #EXECUTE(SAVE_PARENT_STATE);
7. #EXECUTE(NIOP);
8. #ENDIF;

The ON_DISCONNECT script disconnects the device from its current parent. ON_DISCONNECT scripts maintain the device structure and the device counts. The following is a standard ON_DISCONNECT script format.

1. #EXECUTE(CREATE_DISCONNECT_VARIABLES);
2. #EXECUTE(DISCONNECT_FROM_PARENT);
3. #IF(PARENT[PINDEX]::PARENT.DNS[SLOT].USEDEFAULT{E}1);
4. #IF(NUMPARENTS{GT}1);
5. #EXECUTE(SAVE_DISCONNECT_STATE);
6. #EXECUTE(NIOP);
7. #ENDIF;
8. #ELSE;
9. #SET(PARENT[PINDEX]::PARENT.DNS[SLOT].USEDEFAULT,1);
10. #ENDIF;

The VALIDATE script validates device variables. Validate scripts are standard and may not change. The following is a standard VALIDATE script format.

1. #TEMP(RETURNVAL,0,NUMERIC);
2. #EXECUTE(VALIDATE_MINIMUMS);
3. #EXECUTE(VALIDATE_USERNAME);
4. #RETURN(RETURNVAL);

The MACRO script sets up of the device structure to accommodate potential children for the device. MACRO scripts are not required for subsystem and subsystem member devices. In the example below, a SCSI channel is being set up to allow CTS9840 and USP5000 subsystems as children.

Figure 11:
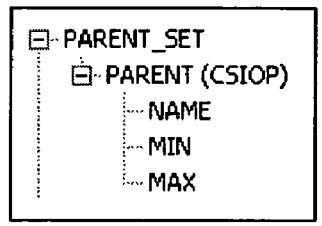

1. #MACRO(SCSI2W);
2. #SET(CHINST,INST);
3. #SET(MAX_CHILD_COUNT,15);
4. #SET(NUM_CHILDREN,15);
5. #SETSIZE(PARENT.DNS,MAX_CHILD_COUNT);
6. #SET(ITER,0);
7. #SET(DEVICEITER,0);
8. #EXECUTE(CREATE_CH_SEQ);
9. #WHILE(ITER{LT}MAX_CHILD_COUNT);
10. #EXECUTE(CREATE_CH_SEQ);
11. #EXECUTE(SETUP_CHILD_SLOT);
12. #SET(PARENT.DNS[ITER].DN[0].ETYPE,'CTS9840-SCSI2W-SULBSYS');
13. #SETSIZE(PARENT.DNS[ITER].DN[0].VA.VS,0);
14. #SET(PARENT.DNS[ITER].DN[1].ETYPE,'USP5000-SCSI2W-SUBSYS');
15. #SETSIZE(PARENT.DNS[ITER].DN[1].VA.VS,0);
16. #ADD(ITER,1);
17. #ADD(DEVICEITER,1);
18. #ENDWHILE;
19. #ENDMACRO;

FIG. 11 is a screen illustration depicting parent characteristics. The PARENT_SET characteristic is a list of the equipment types that may connect to the equipment of FIG. 7. To insert a new parent equipment type, user 4 may right click on PARENT_SET to present a context menu followed by selecting "Add Parent" from the context menu. After a new PARENT characteristic is inserted, the characteristics for the PARENT must be set.

The NAME characteristic is the parent equipment component's EQUIPMENT_NAME. The NAME characteristic must reference an existing equipment component. The MIN characteristic is the minimum number of parents of this equipment type that may be connected. The value of MIN is typically 1. The MAX characteristic is the maximum number of parents of this equipment type that may be connected. The MIN_PARENT_INST or MAX_PARENT_INST values are enforced in cases in which they are more restrictive than the PARENT MIN/MAX characteristic.

Figure 12:
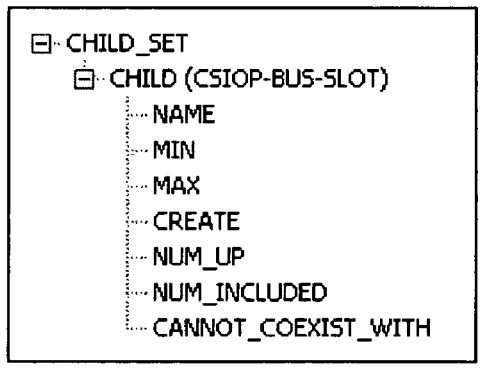

FIG. 12 is a screen illustration depicting child characteristics. In particular, the CHILD_SET characteristic is a list of the equipment types that may be connected to the equipment of FIG. 7. To insert a new child equipment type, user 4 may right click on CHILD_SET to present a context menu followed by selecting "Add Child" from the context menu.

After a new CHILD is inserted, its characteristics must be set. The NAME characteristic is the child equipment component's EQUIPMENT_NAME. NAME must reference an existing equipment component. The MIN characteristic is the minimum number of children of this equipment type that may be connected. The value of MIN is typically 0. The MAX characteristic is the maximum number of children of this equipment type that may be connected. The values of MIN_CHILD_INST or MAX_CHILD_INST are enforced in cases in which they are more restrictive than the CHILD MIN/MAX.

The CREATE characteristic determines whether or not children of this equipment type are created and connected automatically. If CREATE is set to TRUE, a child of this type is created automatically when a device of the current equipment type is added in SCMS II.

The NUM_UP and NUM_INCLUDED characteristic are used in conjunction with CREATE. If CREATE is set to TRUE, NUM_UP specifies the number of automatically generated devices that have a status of UP. The remainder of automatically generated devices are set to DOWN. NUM_INCLUDED specifies the number of automatically created devices that are included in the partition.

The CANNOT_COEXIST_WITH characteristic provides the ability to prevent certain equipment types from being siblings with certain other equipment types. CANNOT_COEXIST_WITH is a comma-separated list of equipment types that this child cannot share a parent with.

Figure 13:
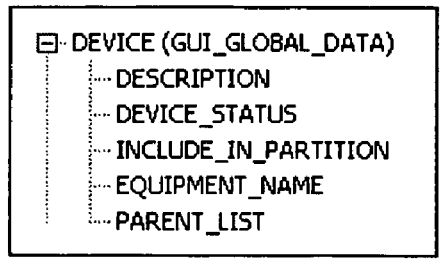

FIG. 13 is a screen illustration depicting device characteristics. Device components are instances of equipment. In particular, device components map to a specific piece of hardware or are a placeholder for other hardware in the system. In the illustrated example, the GUI_GLOBAL_DATA device acts as the root device in the system and is the only device included in HDF 18.

The DESCRIPTION characteristic is an open text field that describes DEVICE (GUI_GLOBAL_DATA). The DEVICE_STATUS characteristic contains the device's initial status. User 4 may select UP, DOWN, RESERVED, or SUSPENDED from the drop-down in the portion 74. The INCLUDE_IN_PARTITION characteristic indicates whether or not the device should be included in the default partition. If it is included, user 4 may select TRUE from the drop-down in portion 74, otherwise, user 4 may select FALSE. The EQUIPMENT_NAME characteristic contains the name of this device's equipment type. An equipment component of this name must exist in the hardware definition. The PARENT_LIST is a comma-separated list of this device's parent devices. Since the GUI_GLOBAL_DATA device does not have parents, this characteristic should not be used in this case.

Figure 14:
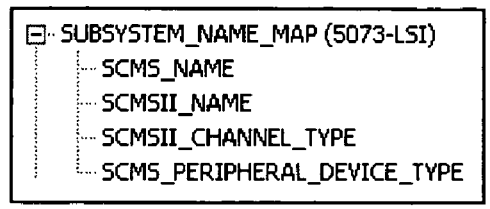

FIG. 14 is a screen illustration depicting subsystem name map characteristics. Subsystem name maps provide a mapping between the SCMS and SCMS II names for a subsystem. When an SCMS export file is imported by SCMS II, the subsystem name map is used to match an SCMS subsystem with the appropriate SCMS II subsystem and configure the SCMS II subsystem appropriately.

The SCMS_NAME characteristic is the SCMS equipment name for the subsystem. The SCMSII_NAME characteristic is the SCMS II equipment name for the subsystem. This value must match the EQUIPMENT_NAME of a subsystem in HDF 18. The SCMSII_NAME may differ from the SCMS_NAME. Alternatively SCMSII_NAME may be left blank in some cases. For example, SCMSII_NAME may be left blank for certain networking subsystems because such subsystems may be handled specially. However, this field may not be left blank for a new subsystem.

The SCMSII_CHANNEL_TYPE characteristic is the SCMS II equipment name of the subsystem's parent channel. This value must match the EQUIPMENT_NAME of a channel in HDF 18. If a subsystem may be connected to more than one channel, the subsystem may have a different subsystem name map component for each channel. If a subsystem can only be connected to one channel type, this field may be left blank.

The SCMS_PERIPHERAL_DEVICE_TYPE characteristic is the SCMS equipment name of one of the subsystem's peripheral devices. Some SCMS subsystems allow multiple equipment types for the connected peripheral devices. In this case, a different subsystem name map component must exist for each supported peripheral device. If only one type of device may be connected to the subsystem in SCMS, this field may be left blank. Typically the SCMS_PERIPHERAL_DEVICE_TYPE characteristic does not need to be specified. In particular, this field may be left blank for new subsystems.

Figure 15:
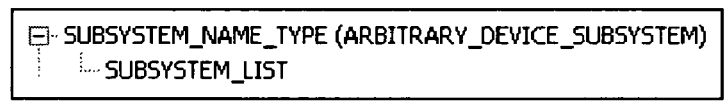

FIG. 15 is a screen illustration depicting subsystem name type characteristics. When an SCMS export file is imported by SCMS II, the subsystem name map is used to match an SCMS subsystem with the appropriate SCMS II subsystem and configure the SCMS II subsystem appropriately. Subsystem name types are also used when an SCMS export file is imported by SCMS II. Certain existing SCMS subsystems require special handling when they are imported into SCMS II. These subsystems fall into one of eight different groupings or types, and one subsystem name type component exists in HDF 18 for each of the types. Subsystem name types are standard and may not be changed. However, new subsystems should not be included in a subsystem name type because they do not require special handling. The SUBSYSTEM_LIST characteristic is a comma-separated list of the SCMS subsystem equipment names that are included in this subsystem name type.

Figure 16:

FIG. 16 is a screen illustration depicting count set characteristics. A count set defines a group of equipment for SCMS II to count. SCMS II maintains and displays tallies of the number devices that are contained in a user-specified set. The EQUIPMENT_LIST characteristic is a comma-separated list of the equipment that is counted for this particular set, i.e., COUNT_SET(IOPs). Each name in the list must correspond to an equipment component in the hardware definition.

Figure 17:
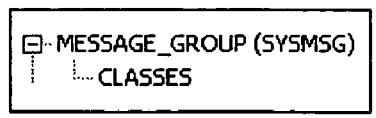

FIG. 17 is a screen illustration depicting message group characteristics. Message group components provide SCMS II with the default message group names and each group's list of possible operating system message classes. The CLASSES characteristic is a comma-separated list of the message group's default message classes. These lists are defined by the operating system and may not be changed in HDF 18.

User interface 70 may also be used to specify format string characteristics (not shown). A format string may be used in similar fashion as a global text string within HDF 18. More specifically, format strings are used to explain the results of the executing of a script within HDF 18 to SCMS II. Each format string includes a name (string identifier) and value (string text), each of which may be edited by user 4 via portion 74. Existing format strings are meant to be localized, however, the meaning of the existing format strings may not be changed unless the scripts which are using the format strings are updated accordingly.

Figure 18:
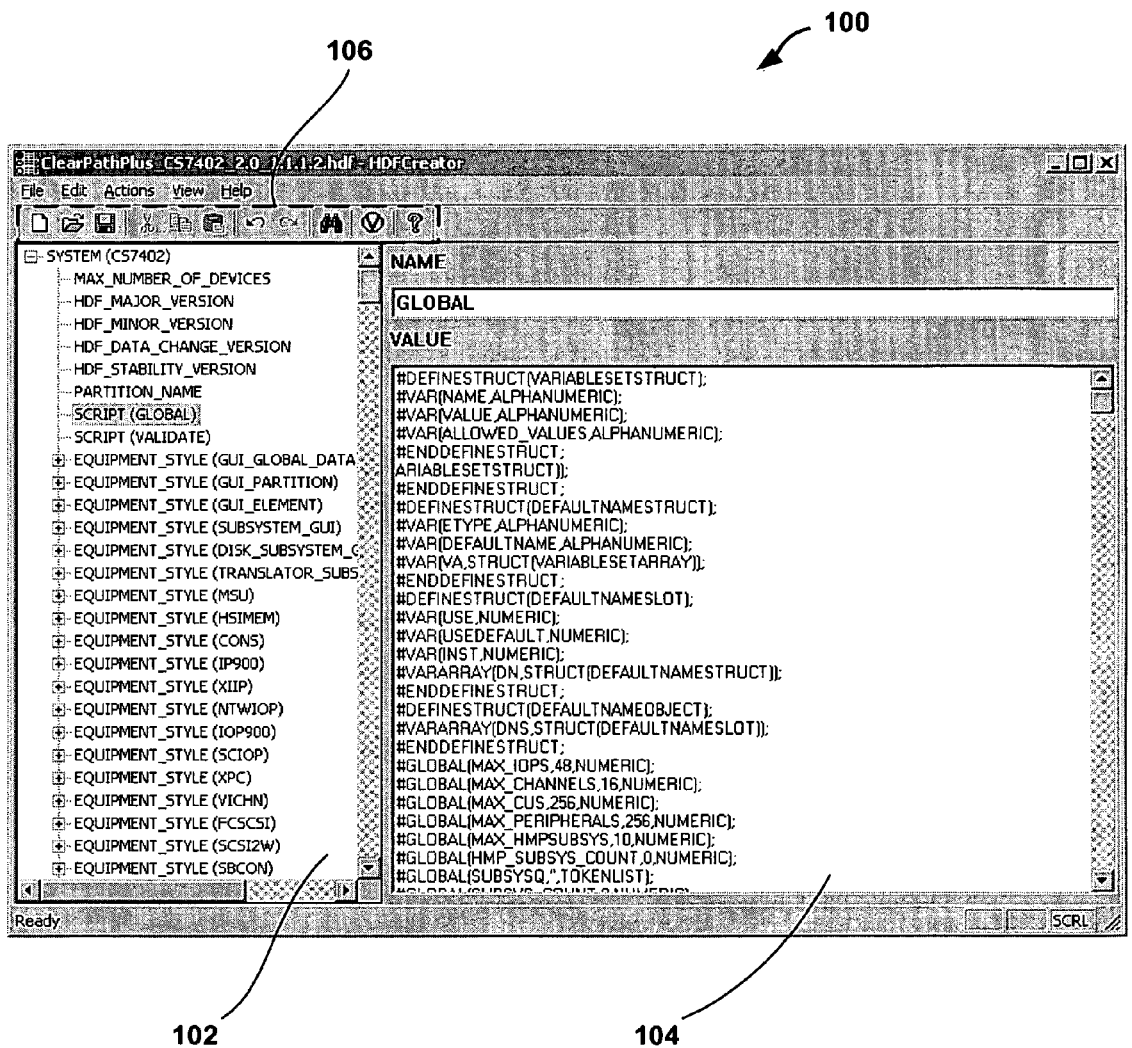

FIG. 18 is a screen illustration depicting an example user interface 100 of hardware definition program 16, e.g. HDF Creator, with which users 4 interact to edit a script. In this example, user interface 100 includes a first portion 102 that includes a hierarchical structure that visually represents the contents of HDF 18 for computer system 12. User interface 100 also includes a second portion 104 that provides an interface to edit the script selected in first portion 102. Second portion 104 may display script commands in red, hard-coded string text in blue, comments in green, and all other text in black, although FIG. 18 does not illustrate as such.

In any case, all script commands beginning with the "#" character and end with a semicolon. Script text must be entered in all capital letters, and space characters may not be used except for in comments. However, the invention is not limited as such. In general any scripting language with syntax that can be embedded in XML or other language suitable for describing configuration data and ignored by XML parsers, may be used. Furthermore, the scripting language special-character set may not overlap the XML special-character set. In addition, comments must be preceded by two forward slashes, i.e., "//", and continue to the end of the line. Cut, copy, paste, undo, and redo operations are available in portion 104 from toolbar 106. Portion 104 also supports Find and Find Next operations in order to enable users 4 to more easily compose hardware definition scripts.

The following describes how to use the hardware definition scripting language, its data types and commands.

The NUMERIC data type stores a numeric value which is an unsigned 64-bit integer value, i.e., whole number between 0 and 4294967295. An ALPHANUMERIC data type stores an alphanumeric string consisting of one or more 8-bit characters (16-bit if using UNICODE). Alphanumeric strings grow dynamically, so no reasonable maximum length is enforced. A TOKENLIST data type is a comma-separated list of alphanumeric strings consisting of one or more 16-bit UNICODE characters. Token lists grow dynamically, so no reasonable maximum length is enforced. Token lists can also be used to simulate an array type. A STRUCT data type or structure is a collection of variables that together form a new variable type.

Next, variable types for the hardware definition scripting language are described. GLOBAL variable types are visible in all scripts. Global variables can be declared in any script, but it is good coding practice to declare them exclusively in the global script. Allowed data types are NUMERIC, ALPHANUMERIC, TOKENLIST, and STRUCT.

Syntax:
GLOBAL(variable_name, initial_value, data_type);
Example:

| | |
|---|---|
| #GLOBAL(name,'DISK0',ALPHANUMERIC); | // A global string |
| #GLOBAL(iter,0,NUMERIC); | // A global integer |
| #GLOBAL(list,'',TOKENLIST); | // A global tokenlist |

TEMP variable types are only visible in the script where it is declared. Temp variables are destroyed after the script completes execution. Temp variables are declared in the same manner as global variables.
Syntax:
TEMP(variable_name, initial_value, data_type);
LOCAL variable types are the median between global and temp variables. As previously described, equipment components specify the names of their child equipment components. As more and more equipment components are added to a hardware definition, a tree-like structure of equipment is built. The visibility of local variables is directly linked to this equipment component structure. Local variables are visible within the component they are declared and in the scripts of all child components.

For example, if four equipment components, EQUIP1, CHILD1, CHILD2, and GRANDCHILD1 are defined, where CHILD1 and CHILD2 are children of EQUIP1, and GRANDCHILD1 is a child of CHILD2. Then, local variables declared in one of EQUIP1's scripts are visible in all of CHILD1, CHILD2, and GRANDCHILD1's scripts. Thus, local variables declared in equipment style component scripts behave like temp variables because equipment styles do not have children.

Local variables are declared in the same manner as global and temp variables.
Syntax:
LOCAL(variable_name, initial_value, data_type);
The VAR command is used to declare a variable within a structure. Structures are discussed in further detail below. VAR's are different from temp, local, and global variables in that their initial values are not specified and that they are only visible from within a structure. VAR's may be of the type NUMERIC, ALPHANUMERIC, TOKENLIST, or STRUCT.
Syntax:
VAR(variable_name, data_type);
Example:
VAR(name,ALPHANUMERIC);
VAR(count,NUMERIC);
VAR(name_struct,STRUCT(default_names));
VARARRAY is the hardware definitiong script language's array type. Similar to VAR, VARARRAY may only be used within a STRUCT declaration. If an array type is required outside of a STRUCT, a token list must be used to simulate an array. VARARRAY supports arrays of any hardware definition script data type.
Syntax:
VARARRAY(variable_name, data type);
Example:
VARARRAY(array_name,NUMERIC);
VARARRAY(array_name,TOKENLIST);
VARARRAY(array_name,STRUCT(default_names));
A STRUCT is a collection of variables that together form a new variable type. Only variables of the type VAR and VARARRAY may be declared within a STRUCT.

Syntax:
DEFINESTRUCT(struct_name);
...
ENDDEFINESTRUCT;
Example:
DEFINESTRUCT(variable_set_struct);
VAR(name,ALPHANUMERIC);
VAR(value,ALPHANUMERIC);
VARARRAY(allowed_values,ALPHANUMERIC);
ENDDEFINESTRUCT;
Structure variables are accessed in the following manner.
TEMP(variable_set, ' ', STRUCT(variable_set_struct))
SET(variable_set.name, 'IF_VARIABLE');
SET(variable_set.value,'5');
SET(value,variable_set.allowed_values[3]);
The following describes comparison operators for the hardware definition scripting language. E is used to determine if two values are equal. All comparison operators must be enclosed by { }.
Syntax:
IF(variable_name1 or constant {E} variable_name2 or constant);
Allowed Data Types
variable_name1—NUMERIC or ALPHANUMERIC
variable_name2—NUMERIC or ALPHANUMERIC
variable_name1 and variable_name2 must be of the same type.
NE is used to determine if two values are not equal.
Syntax:
IF(variable_name1 or constant {NE} variable_name2 or constant);
Allowed Data Types
variable_name1—NUMERIC or ALPHANUMERIC
variable_name2—NUMERIC or ALPHANUMERIC
variable_name1 and variable_name2 must be of the same type.
LT is used to determine if the value of variable_name1 is less than the value of variable_name2.
Syntax:
IF(variable_name1 or constant {LT} variable_name2 or constant);
Allowed Data Types
variable_name1—NUMERIC or ALPHANUMERIC
variable_name2—NUMERIC or ALPHANUMERIC
variable_name1 and variable_name2 must be of the same type.
GT is used to determine if the value of variable_name1 is greater than the value of variable_name2.
Syntax:
IF(variable_name1 or constant {GT} variable_name2 or constant);
Allowed Data Types
variable_name 1—NUMERIC or ALPHANUMERIC
variable_name2—NUMERIC or ALPHANUMERIC
variable_name1 and variable_name2 must be of the same type.
LTE is used to determine if the value of variable_name1 is less than or equal to the value of variable_name2.
Syntax:
IF(variable_name1 or constant {LTE} variable_name2 or constant);
Allowed Data Types
variable_name1—NUMERIC or ALPHANUMERIC
variable_name2—NUMERIC or ALPHANUMERIC
variable_name1 and variable_name2 must be of the same type.

GTE is used to determine if the value of variable_name1 is greater than or equal to the value of variable_name2.
Syntax:
IF(variable_name1 or constant {GTE} variable_name2 or constant);
Allowed Data Types
variable_name1—NUMERIC or ALPHANUMERIC
variable_name2—NUMERIC or ALPHANUMERIC
variable_name1 and variable_name2 must be of the same type.

The following describes control structures for the hardware definition scripting language. IF, ELSE, ELSEIF, and ENDIF delimit an if statement.
Syntax:
IF(variable_name1 {comparison operator}variable_name2 or constant);
. . .
ELSEIF(variable_name1 {comparison operator} variable_name2 or constant)
. . .
ELSE;
. . .
ENDIF;
Example:
IF(name{E} 5);
  #ADD(name,1);
ELSEIF(name{NE}name2);
  #SUB(name,1);
ELSE
  #SET(name,0);
ENDIF;
WHILE and ENDWHILE delimit a while loop.
Syntax:
WHILE(variable_name1 {comparison operator} variable_name2 or constant);
. . .
ENDWHILE;
BREAK
BREAK steps out of a while loop.
Syntax:
BREAK;
CONTINUE jumps from a line within a while loop forward to the next execution of the loop's condition statement. It is used to conditionally skip over a block of code while continuing execution of the loop.
Syntax:
CONTINUE;
MACRO and ENDMARCRO delimit a script macro. A macro is a block of code that will be executed in the place of the macro's EXECUTE call.
Syntax:
MACRO(macro name);
ENDMACRO;
EXECUTE executes a macro. The code contained in the macro will be run in the place of the #EXECUTE statement.
Syntax:
EXECUTE(macro name);
RETURN ceases execution of a script and returns control to the caller. A numeric value may be passed back to the caller from the RETURN operation.
Syntax:
RETURN(return_value);
The following describes basic script commands for the hardware definition scripting language. The set operation sets variable_name1 to the value of variable_name2.
Syntax:
SET(variable_name1, variable_name2 or constant);

Allowed Data Types
variable_name1—NUMERIC, ALPHANUMERIC, TOKENLIST, or STRUCT
variable_name2—NUMERIC, ALPHANUMERIC, TOKENLIST, or STRUCT
variable_name1 and variable_name2 must be of the same type.
Example:

```
#SET(count,0);                         // Sets the value of count to 0
#SET(string1,'ABC');                   // Sets the value of string1 to 'ABC'
#SET(variable_struct,temp_struct);     // Sets the value of variable_struct
                                       // to that of temp_struct
```

GENNUMBER converts an alphanumeric string to a numeric value. This operation generates numeric values of base 8, 10, or 16. If a base is not specified in the function call, base 10 is assumed.
Syntax:
GENNUMBER(number, string, base=10);
Allowed Data Types
number—NUMERIC
string—ALPHANUMERIC
base—NUMERIC (8, 10, or 16)
Example:

```
#GENNUMBER(slot,'5');           // The value of slot equals 5.
#GENNUMBER(slot,slotstr);       // Slot equals the numeric value of
                                // slotstr.
```

GENSTRING is the reverse of GENNUMBER. This operation converts a value to an alphanumeric string. The GENSTRING operation function in a similar manner as a C-style sprintf statement.
Syntax:
GENSTRING(string, '[%D]', number);
Allowed Data Types
string—ALPHANUMERIC
number—NUMERIC
This operation supports standard C-style sprintf codes such as %D, %C, %S, and % X. The character following the percent must be uppercase.
Example:

```
#GENSTRNG(slotstr,'[%D]',slot);      // The value of slot is converted to
                                     // a string.
#GENSTRNG(slotstr,'[%03D]',slot);    // The value of slot is converted to
                                     // at least a three-character, zero-
                                     // filled string.
#GENSTRING(slotstr,'[%X]'slot);      // The hexadecimal value of slot is
                                     // converted to a string
```

The GENERROR operation generates an error that is displayed in SCMS II and prevents partition file generation. The GENERROR function takes a minimum of three input parameters. The first is the name of the error's format string component. As previously described, format strings are used to explain the results of an HDF script's execution to SCMS II. In this case the format string is explaining the error to SCMS II. The second parameter is a list of secondary devices in error. In some cases an error may affect more than one device in the system configuration. The secondary device list is a comma separated alphanumeric string. If the error has no secondary devices, a blank string may be passed in the place of this parameter. The third parameter is the name of the equipment style variable value in error. If for example a device has an invalid address, then the name of the address variable is passed. If the error does not relate to an equipment style variable, a blank string may be passed in the place of this parameter. The remaining parameters are the input values required to build the format string. For example, say the format string "This device must have at least [% D].[%S] children included in the partition" is being passed to GENERROR. Then the final two parameters will be a numeric value to replace [% D] and an alphanumeric value to replace [%S].

Syntax:
GENERROR(format_string_name, secondary_devices, variable_in_error, value1, value2, . . . )
Allowed Data Types
format_string name—format string
secondary_devices—ALPHANUMERIC
variable_in_error—ALPHANUMERIC
value 1, value2, . . . —NUMERIC or ALPHANUMERIC
Example:
// A MIN_MAX_MIPS_ERROR is generated for the variable MIN_MIPS.
// There are no secondary devices for this error.
GENERROR('MIN_MAX_MIPS_ERROR','','MIN_MIPS');
// A MIN_EQUIPMENT_ERROR is generated.
// There are no secondary devices for this error.
// This error is not related to an equipment style variable.
// The value of IP is used as input to the format string
// MIN_EQUIPMENT_ERROR.
GENERROR('MIN_EQUIPMENT_ERROR', '','',IP);

The set size operation sets the size of a variable array. This function may be called after initialization to change the size of a variable array.

Syntax:
SETSIZE(variable_array, size or constant);
Allowed Data Types
variable_array—VARARRAY
size—NUMERIC
Example:

```
#SETSIZE(name_array,20);      // Sets the size of name_array to 20
#SETSIZE(name_array,count);   // Sets the size of name_array to the
                              // the value of count
```

The get size operation returns the size of a variable array.
Syntax:
GETSIZE(variable_array, size);
Allowed Data Types
variable_array—VARARRAY
size —NUMERIC
size is an output parameter that will hold the size of the array.
Example:
// The value of array_size will be the size of name_array.
GETSIZE(name_array,array_size);

The display variable operation displays a message box with the input variable's value. This is a debugging operation and should never be used in a completed script.

Syntax:
DISPLAYVARIABLE(variable_name);
Allowed Data Types
variable_name —NUMERIC, ALPHANUMERIC, TOKENLIST, or STRUCT The following describes arithmetic operations for the hardware definition scripting language. The add operation will find the sum of two numbers, concatenate a string, or add a token to a token list.

Syntax:
ADD(variable_name1, variable_name2 or constant);
Allowed Data Types
variable_name1 —NUMERIC, APLHANUMERIC, and TOKENLIST
variable_name2—NUMERIC and ALPHANUMERIC
Example:

```
#ADD(count,5);               // count = count + 5
#ADD(count,index);           // count = count + index
#ADD(name_string,'END');     // Appends 'END' to the end of
                             name_string
```

The add operation can also be used to add a token to the end of an existing token list.

```
#TEMP(device_list,' ',TOKENLIST);
#ADD(device_list,'DEVICE1');         // Adds the token 'DEVICE1 to
device_list
#ADD(device_list,device_name);       // Adds a token with the value of
                                     // device_name to device_list
```

The subtract operation will find the difference between two numbers. There is no subtract operation for strings or token lists.

Syntax:
SUB(variable_name1, variable_name2 or constant);
Allowed Data Types
variable_name 1—NUMERIC
variable_name2—NUMERIC
Example:

```
#SUB(count,5);        // count = count – 5
#SUB(count,index);    // count = count – index
```

The multiply operation will find the product of two numbers.
Syntax:
MUL(variable_name1, variable_name2 or constant);
Allowed Data Types
variable_name1—NUMERIC
variable_name2—NUMERIC
Example:

```
#MUL(count,5);        // count = count * 5
#MUL(count,index);    // count = count * index
```

The divide operation will find the two numbers' quotient.
Syntax:
DIV(variable_name1, variable_name2 or constant);
Allowed Data Types
variable_name1—NUMERIC
variable_name2—NUMERIC Example:

```
#DIV(count,5);           // count = count/5
#DIV(count,index);       // count = count/index
```

The modulus operation will find the two numbers' modulus.
Syntax:
MOD(variable_name1, variable_name2 or constant);
Allowed Data Types
variable_name1 —NUMERIC
variable_name2—NUMERIC
Example:

```
#MOD(count,5);           // count = count % 5
#MOD(count,index);       // count = count % index
```

The following describes string operations for the hardware definition scripting language. The CONTAINSSTRING operation checks a string for the existence of a substring. If the substring exists in the string, CONTAINSSTRING returns 'TRUE'; otherwise, it returns 'FALSE'.
Syntax:
CONTAINSSTRING(return_value, string, substring);
Allowed Data Types
return_value—ALPHANUMERIC (The string 'TRUE' or 'FALSE' is returned.)
string—ALPHANUMERIC
substring—ALPHANUMERIC
Example:
    // Searches the string name for the character '*'
    #CONTAINSSTRING(contains_char,name, '*');
    // Searches the string device for the string 'IOP'
    #CONTAINSSTRING(contains_char,device, 'IOP');
The FILLSTRING operation sets the length of a string and fills it with a leading or trailing value.
Syntax:
    #FILLSTRING(string, fill_character, string_length, LEFT or RIGHT);
Allowed Data Types
string—ALPHANUMERIC
fill_character—1 ALPHANUMERIC character
string_length—NUMERIC
Example:

```
#FILLSTRING(devicestr,'0',5,LEFT);    // Fills the 5-character
string with
                                       // leading zeros
#FILLSTRING(devicestr,'7',4,RIGHT);   // Fills the 4-character
string with
                                       // trailing 7's
```

The ADDALPHASTRING operation increments an alphanumeric string (first parameter) by the value of the second parameter. For example, if string1 has an initial value of 'ABC'. Then, if 1 is added to string1 using add alpha string, the resulting value of string1 is 'ABD'. However, if 2 is added, the resulting value is 'ABE'. The same algorithm applies to numeric characters.
Syntax:
ADDALPHASTRING(string, number or constant);
Allowed Data Types
string—ALPHANUMERIC
number—NUMERIC
Example:

```
// Assume string1 has a value of '1234'.
#ADDALPHASTRING(string1,1);   // string1 now equals '1235'.
// Assume string1 has a value of 'ABC'.
#ADDALPHASTRING(string1,2);   // string1 now equals 'ABE'.
```

SUBTRACTALPHASTRING operates in the same manner as ADDALPHASTRING except it decrements an alphanumeric string (first parameter) by the value of the second parameter.
Syntax:
SUBTRACTALPHASTRING(string, number or constant);
Allowed Data Types
string—ALPHANUMERIC
number—NUMERIC
Example:

```
// Assume string 1 has a value of 'ABC'.
#SUBTRACTALPHASTRING(string1,1);  // string1 now equals 'ABB'.
// Assume string1 has a value of '1233'.
#SUBTRACTALPHASTRING(string1,4);  // string1 now equals '1229'.
```

The following describes token list operations for hardware definition scripting language. The INSERT operation adds a token at a specified index in a token list. The index must be within the range 0 to the number of tokens in the token list. If an index is equal to the number of tokens in the list, the new token is added to the end of the list. Remember, the ADD operation can also be used to add a token to the end of a token list.
Syntax:
    #INSERT(token_list, token, index);
Allowed Data Types
token_list—TOKENLIST
token—ALPHANUMERIC
index—NUMERIC
Example:

```
// Assume list contains tokens 'A', 'B', and 'C' in positions 0, 1, and 2.
#INSERT(list,'D',2);       // list has the tokens 'A', 'B', 'D', 'C'.
// Assume list contains tokens 'A', 'B', and 'C' in positions 0, 1, and 2.
#INSERT(list,'D',3);       // list has the tokens 'A', 'B', 'C', 'D'.
```

The REMOVE operation deletes a token from a token list.
Syntax:
    #REMOVE(token_list, index);
Allowed Data Types
token_list—TOKENLIST
index—NUMERIC
Example:

```
#REMOVE(list,0);           // The first token is removed from list.
```

The GETNUMBEROFTOKENS operation returns the number of tokens in a token list.

Syntax:
    #GETNUMBEROFTOKENS(number_of tokens, token_list);
Allowed Data Types
number_of tokens—NUMERIC
token_list—TOKENLIST
Example:

```
#GETNUMBEROFTOKENS(count,list);    // Count now contains the
                                   // number of tokens in list.
```

The FINDTOKEN operation returns the index of a given token in a token list. It should be confirmed that the specified token is in the token list before FINDTOKEN is called. This operation does not return a meaningful value when the token is not found.
Syntax:
    #FINDTOKEN(index,token_list,token);
Allowed Data Types
index—NUMERIC
token_list—TOKENLIST
token—ALPHANUMERIC
Example:

```
#FINDTOKEN(index,list,'DEVICE1');   // index holds the position
                                    // of the token 'DEVICE1'.
```

The SORT operations sorts a token list in string order
Syntax:
    #SORT(token_list);
Allowed Data Types
token_list—TOKENLIST
Example:

```
// Assume list has the tokens 'AA', 'AB', '1', '2', '11', '21'.
#SORT(list);      // list's tokens are now in the order
                  // 'AA', 'AB', '1', '11', '2', '21'.
```

The SORTNUMERIC operation sorts a token list in number order.
Syntax:
    #SORTNUMERIC(token_list);
Allowed Data Types
token_list—TOKENLIST
Example:

```
// Assume list has the tokens '1', '2', '11', '21'.
#SORTNUMERIC(list);    // list's tokens are now in the
                       // order '1', '2', '11', '21'.
```

The following describes SCMS II interface operations for the hardware definition scripting language. After a hardware definition is loaded, SCMS II maintains a mapping of the equipment and device components in memory. As new devices are inserted into the system, the devices added to this structure. Many times it is necessary for the script to retrieve and set data in the structure of SCMS II, such as when users 4 modify the property of an entity. The following operations provide this access.

The GETCURRENTPARTITION operation returns the name of the partition from which the script is being executed. This partition is always the active partition in SCMS II.
Syntax:
    #GETCURRENTPARTITION(partition_name);
Allowed Data Types
partition_name—ALPHANUMERIC The GETCURRENTDEVICE operation returns the name of the device from which the script is being executed. All scripts are run on behalf of either a device or a partition. The GETCURRENTDEVICE and GETCURRENTPARTITION operations can be used to determine the source of a script call.
Syntax:
    #GETCURRENTDEVICE(device_name);
Allowed Data Types
device_name—ALPHANUMERIC The GETUSERNAME operation returns the current device's username. SCMS II allows users to use a custom name for a device in lieu of the default name. If no username has been set, the username is the same as the default name.
Syntax:
    #GETUSERNAME(user_name, device_name);
Allowed Data Types
user_name—ALPHANUMERIC
device_name—ALPHANUMERIC The GETDEVICEMNEMONIC operation returns the current device's equipment mnemonic.
Syntax:
    #GETDEVICEMNEMONIC(mnemonic, device_name);
Allowed Data Types
mnemonic—ALPHANUMERIC
device_name—ALPHANUMERIC The GETDEVICESTATUS operation returns the current device's status, e.g., UP, DN, RV, or SU.
Syntax:
    #GETDEVICESTATUS(device_status, device_name);
Allowed Data Types
device_status—ALPHANUMERIC
device_name—ALPHANUMERIC The GETINCLUDEINPARTITION operation returns the current device's include in partition state, i.e., TRUE or FALSE.
Syntax:
    #GETINCLUDEINPARTITION(include_state, device_name);
Allowed Data Types
include_state—ALPHANUMERIC
device_name—ALPHANUMERIC The GETVARINFOVALUE returns the value of a device variable.
Syntax:
GETVARINFOVALUE(value, partition_name or device_name, variable_name);
Allowed Data Types
value—NUMERIC and ALPHANUMERIC
partition_name, device_name—ALPHANUMERIC
variable_name—ALPHANUMERIC The GETMINIMUMCHILDREN operation returns the minimum number of children the current device may have.
Syntax:
    #GETMINIMUMCHILDREN(min_children, device_name);
Allowed Data Types
min_children—NUMERIC
device_name—ALPHANUMERIC The GETCURRENTDEVICETYPE operation returns the current device's equipment name.
Syntax:
GETCURRENTDEVICETYPE(equipment_name);
Allowed Data Types
equipment_name—ALPHANUMERIC The GETPARENTTYPE operation returns the equipment name of a device's parent device.
Syntax:
GETPARENTTYPE(equipment_name, device_name);
Allowed Data Types
equipment_name—ALPHANUMERIC
device_name—ALPHANUMERIC The GETCURRENTPARENTTYPE operation returns the equipment name of the current device's parent device.
Syntax:
GETCURRENTPARENTTYPE(equipment_name);
Allowed Data Types
equipment_name—ALPHANUMERIC The GETCHILDTYPE operation returns the equipment name of the current device's child devices.
Syntax:
GETCHILDTYPE(equipment_name, child_name);
Allowed Data Types
equipment_name—ALPHANUMERIC
child_name—ALPHANUMERIC The GETCHILDSET operation returns a list of the current device's possible child equipment types.
Syntax:
GETCHILDSET(child_equipment_list);
Allowed Data Types
child_equipment_list—TOKENLIST The GETBOOT operation returns the name of the system's boot device.
Syntax:
GETBOOT(boot_device_name);
Allowed Data Types
boot_device_name—ALPHANUMERIC The GETDRS operation returns the name of the system's DRS disk.
Syntax:
GETDRS(drs_device_name);
Allowed Data Types
drs_device_name—ALPHANUMERIC The GETSHAREDDRS operation returns the name of the system's shared DRS disk.
Syntax:
GETSHAREDDRS(shared_drs_device_name);
Allowed Data Types
shared_drs_device_name—ALPHANUMERIC The GETSHAREDDRSREQUIRED operation returns TRUE if a shared DRS is required and FALSE if it is not.
Syntax:
GETSHAREDDRSREQUIRED(shared_drs_required);
Allowed Data Types
shared_drs_required—ALPHANUMERIC The GETCURRENTPARENT operation returns the name of a device's parent device.
Syntax:
GETCURRENTPARENT(parent);
Allowed Data Types
parent—ALPHANUMERIC The GETPARENTLIST operation returns a list of the device's parent devices.
Syntax:
GETPARENTLIST(parent_ist);
Allowed Data Types
parent_list—TOKENLIST The GETSIBLINGLIST operation returns a list of the device's sibling devices. If the device has no siblings, an empty list will be returned.
Syntax:
GETSIBLINGLIST(sibling_list);
Allowed Data Types
siblingjist—TOKENLIST The GETCHILDLIST operation returns a list of the device's child devices. If the device has no children, an empty list will be returned.
Syntax:
GETCHILDLIST(child_list);
Allowed Data Types
child_list—TOKENLIST The GETSTRINGFROMHASH operation behaves in a similar manner as the GENSTRING operation. It takes the value returned from a hash operation and converts it to a string.
Syntax:
GETSTRINGFROMHASH(device_string, value_from_hash);
Allowed Data Types
device_string—ALPHANUMERIC
value_from_hash—NUMERIC FORMAT is used to by SCMS II to access the value of an HDF script variable. A FORMAT call passes the value of the formatted string to SCMS II. In the existing scripts, FORMAT calls set device default names and variable info.
Syntax:
FORMAT(default_name_string, val1, val2, . . . );
Allowed Data Types
default_name_string—ALPHANUMERIC
val1, val2, . . . —NUMERIC or ALPHANUMERIC The FINDDEVICESBYEQUIPMENTNAME operation returns a list of devices that share the same equipment name.
Syntax:
FINDDEVICESBYEQUIPMENTNAME(device_list, equipment_name);
Allowed Data Types
device_list—TOKENLIST
equipment_name—ALPHANUMERIC The FINDDEVICESBYEQUIPMENTCLASS operation returns a list of devices that are members of the same equipment class. HDF Creator allows the following equipment classes: GUI_ELEMENT, IP, IOP, CHANNEL, CONTROL_UNIT, DEVICE, MEMORY, XIIP, and XPC.
Syntax:
FINDDEVICESBYEQUIPMENTCLASS(device_list, equipment_class);
Allowed Data Types
device_list—TOKENLIST
equipment_class—ALPHANUMERIC The FINDDEVICESBYEQUIPMENTSUBCLASS operation returns a list of devices that are of the same equipment subclass. HDF Creator allows the following equipment subclasses: CONSOLE and NETWORK.
Syntax:
FINDDEVICESBYEQUIPMENTSUBCLASS(device_list, subclass);
Allowed Data Types
device_list—TOKENLIST
subclass—ALPHANUMERIC The CHECKCHANNELRACK operation returns whether the current device can be connected beneath the current parent, according to CSIOP channel rack rules. It returns 0 if the connection is not allowed and returns 1 if it is.

Syntax:
    #CHECKCHANNELRACK(return_value);
Allowed Data Types
return_value—NUMERIC The following describe validate operations for the hardware definition scripting language. Validate operations are executed in order to check for invalid system configurations. SCMS II runs the validate scripts before generating a partition profile. If any of the validate scripts generate an error, the user is notified, and the partition profile is not created. SCMS II also performs real-time validation in which users 4 are notified as modifications are made to the configuration.

Syntax:
    #VALIDATECUIFNUMBER;
    #VALIDATEVARIABLEUNIQUE;
    #VALIDATEMESSAGEGROUPS;
    #VALIDATEMEMS;
    #VALIDATESPOS;
    #VALIDATECUCONN;
    #VALIDATECHCONN;

Each hardware definition script includes a global and a validate script which is located above the equipment style components in portion 102 in the illustrated example. Generally, the global and validate scripts serve to organize variables and macros that are used by multiple equipment or equipment style scripts. The global script is a container for script macros that are used in multiple components throughout the hardware definition and generally support the device structure and naming.

The hardware definition device structure lies at the heart of device naming and in many cases device connections. This structure, which is defined in the global script, holds the pertinent information about all of the system's potential non-subsystem member devices. The device structure is a layering of different structures. The following explanation begins at the lowest level and defines consecutively higher levels ending at the instantiation of the hardware definition's device structure variable.

The VARIABLESETSTRUCT defines a variable for a device in the device structure. A variable has three parts, i.e., name, value, and allowed values.

DEFINESTRUCT(VARIABLESETSTRUCT);
    #VAR(NAME,ALPHANUMERIC);
    #VAR(VALUE,ALPHANUMERIC);
    #VAR(ALLOWED_VALUES,ALPHANUMERIC);
    #ENDDEFINESTRUCT;

Since devices may have more than one variable, an array of VARIABLESETSTRUCT's may be created. The size of the array is potentially different for each device in the device structure.

DEFINESTRUCT(VARIABLESETARRAY);
    #VARARRAY(VS,STRUCT(VARIABLESETSTRUCT));
    #ENDDEFINESTRUCT;

In addition to the variable information stored in the device structure, the DEFAULTNAMESTRUCT stores the information for the variable of each device, i.e., the unique default name, and etype. The etype is the device's equipment mnemonic. The default name is a unique, six-character identifier for the device. These names are generated and placed in the device structure by the equipment macro scripts.

DEFINESTRUCT(DEFAULTNAMESTRUCT);
    #VAR(ETYPE,ALPHANUMERIC);
    #VAR(DEFAULTNAME,ALPHANUMERIC);
    #VAR(VA,STRUCT(VARIABLESETARRAY));
    #ENDDEFINESTRUCT;

The DEFAULTNAMESTRUCT describes a device, but the DEFAULTNAMESLOT structure describes a device location in the device structure. These device locations, referred to as slots, are assigned and unassigned as devices are connected and disconnected in SCMS II.

DEFINESTRUCT(DEFAULTNAMESLOT);
    #VAR(USE,NUMERIC);
    #VAR(USEDEFAULT,NUMERIC);
    #VAR(INST,NUMERIC);
    #VARARRAY(DN,STRUCT(DEFAULTNAMESTRUCT));
    #ENDDEFINESTRUCT;

The DEFAULTNAMESLOT structure contains an array of DEFAULTNAMESTRUCT's. Device default names may be different depending on the type of device that is connected, so each slot must have a DEFAULTNAMESTRUCT instance for each type of device that can be connected at this location. The USE and USEDEFAULT flags indicate whether or not the slot is in use. A slot is considered to be in use when a device is added to the system at the location specified by the slot. The value of USE equals 0 when the slot is not in use and 1 when it is in use.

In particular, SCMS II allows users to configure devices with multiple upward connections. In this case a device may use two or more slots in the device structure, each slot corresponding to one of the parents. When the device is initially connected, the device is assigned a default name based on its first location in the device structure. The device retains this default name throughout subsequent connections. However, if the device becomes disconnected from its first location, the default name associated with this location is no longer valid, and the device must be renamed.

If the device using a slot uses the default name specified in one of the slot's DEFAULTNAMESTRUCT instances, then the slot's USEDEFAULT value is set to 1. If the device is using a default name from a different slot (under a different parent), USEDEFAULT is set to 0.

INST is a numeric identifier for the device. The DEFAULTNAMEOBJECT holds an array of DEFAULTNAMESLOT's—one per possible child to this device.

DEFINESTRUCT (DEFAULTNAMEOBJECT);
    #VARARRAY(DNS,STRUCT(DEFAULTNAMESLOT));
    #ENDDEFINESTRUCT;

One instance of the DEFAULTNAMEOBJECT is declared per device in the system, with the exception of subsystem member devices. PARENT, the variable of the type DEFAULTNAMEOBJECT, is declared when a device is created by executing the CREATE_COMMON_VARIABLES macro.

MACRO(CREATE_COMMON_VARIABLES);
    . . .
    #LOCAL(PARENT,0,STRUCT(DEFAULTNAMEOBJECT));
    . . .
    #ENDMACRO;

The device structure is populated by equipment macro scripts. Each equipment component inserts slots in the device structure for its potential children. For example, an IOP's equipment macro builds the portion of the device structure necessary to hold all of its child channels. In other words, each channel's macro builds the portion of the device structure necessary to hold all of its subsystems.

When a new device is added, an unused slot is located in the device structure, and the default name associated with that slot is assigned to the device. If a device is moved from one location to another, its default name is reassigned based on the default name associated with the device's new slot. This process of renaming may also occur when one of a device's upward connections is deleted. For example, if DEV001 is using slots A and B, and the default name of DEV001 is based on that of slot A. If the device is removed or disconnected from slot A, then DEV001 is renamed based on its default name for slot B.

However, subsystem devices use slots in the device structure and default names are not generated for these slots. Rather, subsystem devices are named on the fly as previously described. Subsystem member devices, e.g., control units and peripherals, use neither slots nor their default names. Thus, subsystem member devices are also named on the fly as previously discussed. Subsystems and subsystem members default names are persistent throughout the life of the device. These devices are not renamed when they are moved or disconnected.

Figure 19:
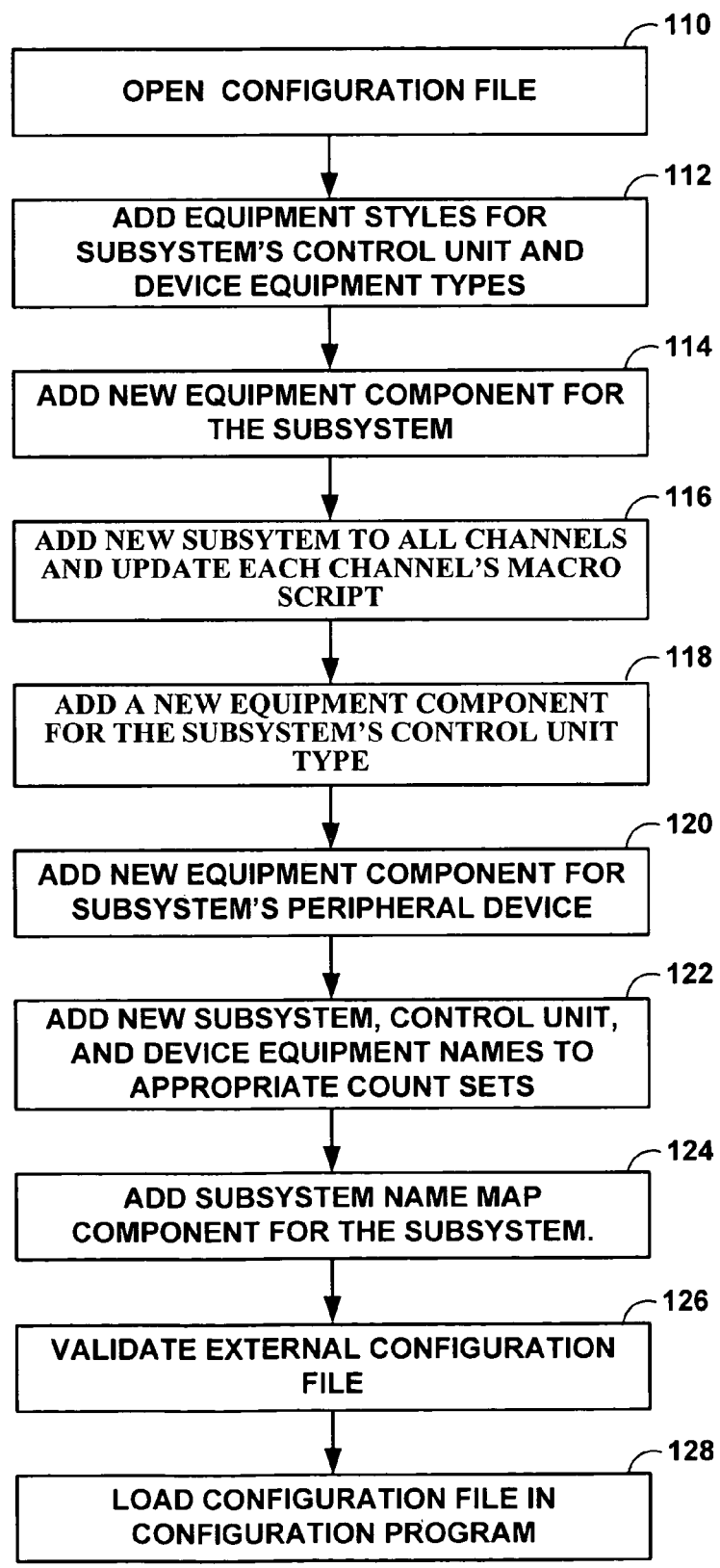
FIG. 19 is a flowchart illustrating exemplary operation of the system for adding a subsystem to an existing external configuration file.

FIG. 19 is a flowchart illustrating exemplary operation of system 2 for adding a subsystem to an existing external configuration file. A subsystem is a symmetrical grouping of control units and peripheral devices. It consists of at least three different equipment components: a subsystem component, a control unit component, and a peripheral device component, such as a disk or tape.

Initially, user interface software module 8 executes hardware definition program 16 with which users 4 interact to generate HDF 18. Users 4 may generally be authorized users who remotely manage a configuration for computer system 12 via a graphical user interface such as graphical user interface 100 of FIG. 18. To add a subsystem to an existing hardware definition, users 4 open HDF 18 in hardware definition program 16 (110). Users 4 may then add equipment styles for the new subsystem's control unit and equipment types (112). Accordingly, users 4 may set the characteristics for the new equipment styles and insert the necessary variables.

Next, users 4 may add a new equipment component for the subsystem (114) and set the equipment characteristics and child and parent sets appropriately. Users 4 may input the equipment scripts as shown below. Text in bold type must be updated with the specific values for the new subsystem.

```
Script (DEFAULT_NAME)
#EXECUTE(CREATE_COMMON_VARIABLES);
#EXECUTE(CREATE_SUBSYS_VARIABLES);
#EXECUTE(FIND_SLOT);
#EXECUTE(GET_NEXT_SUBSYS_ID);
#FORMAT('USDXXXX-D-SUBSYS-[%S]',SUB-
   SYS_ID);
#GENSTRING(PARENT::PARENT.DNS[SLOT].DN
   [ITER2].DEFAULTNAME,'USDXXXX-D-SUBSYS-
   [%S]',SUBSYS_ID);
#SET(SUBSYS_NAME,PARENT::PARENT.DNS
   [SLOT].DN[ITER2].DEFAULTNAM E);
Script (MACRO)
#MACRO(USDXXXX-D-SCSI2W-SUBSYS);
#SET(CHINST,INST);
#ENDMACRO,
Script (REFRESH) // Leave blank
Script (CAN_CONNECT) // Leave blank
Script (ON_CONNECT)
#EXECUTE(CREATE_CONNECT_VARIABLES);
#EXECUTE(CONNECT_TO_PARENT);
#IF(NUMPARENTS{GT}0);
#SET(CURRENTPARENT::PARENT.DNS[SLOT]
   .USEDEFAULT,0);
#ELSE;
#EXECUTE(SAVE_PARENT_STATE);
#EXECUTE(USDXXXX-D-SCSI2W-SUBSYS);
#EXECUTE(RECLAIM_SUBSYS_ID);
#ENDIF;
Script (ON_DISCONNECT)
#EXECUTE(CREATE_DISCONNECT_VARIABLES);
#EXECUTE(DISCONNECT_FROM_PARENT);
#IF(PARENT[PINDEX]::PARENT.DNS[SLOT]
   .USEDEFAULT{E}1);
#IF(NUMPARENTS{GT}1);
#EXECUTE(SAVE_DISCONNECT_STATE);
#EXECUTE(USDXXXX-D-FCSCSI-SUBSYS);
#ELSE;
#EXECUTE(REMOVE_SUBSYS_ID);
#ENDIF;
#ELSE;
#SET(PARENT[PINDEX]::PARENT.DNS[SLOT]
   .USEDEFAULT,1);
#ENDIF;
Script (VALIDATE)
#TEMP(RETURNVAL,0,NUMERIC);
#EXECUTE(VALIDATE_MINIMUMS);
#EXECUTE(VALIDATE_USERNAME);
#RETURN(RETURNVAL);
```

Next, the new subsystem is added to the child sets of all channels to which the new subsystem may be connected and the macro script for each channel is updated to create slots in the device structure for the subsystem (116). Users 4 may input the macro script as shown below. Text in bold type must be updated with the specific values for the new subsystem.

```
Script (MACRO)
#MACRO(SCSI2W);
#SET(CHINST,INST);
// This is the maximum number of children the channel may
   have
// This number is equal to the channel's MAX_CHILD_
   INST value
#SET(MAX_CHILD_COUNT,15);
// This is the number of different types of children the
// channel may have. It is incremented each time a new
// subsystem is added
#SET(NUM_CHILDREN,4);
#SETSIZE(PARENT.DNS,MAX_CHILD_COUNT);
#SET(ITER,0);
#SET(DEVICEITER,0);
#EXECUTE(CREATE_CH_SEQ);
#WHILE(ITER{LT}MAX_CHILD_COUNT);
#EXECUTE(CREATE_CH_SEQ);
#EXECUTE(SETUP_CHILD_SLOT);
#SET(PARENT.DNS[ITER].DN[0].ETYPE,'CTS9840-
   SCSI2W-SUBSYS');
#SETSIZE(PARENT.DNS[ITER].DN[0].VA.VS,0);
#SET(PARENT.DNS[ITER].DN[1].ETYPE,'USP5000-
   SCSI2W-SUBSYS');
#SETSIZE(PARENT.DNS[ITER].DN[1].VA.VS,0);
#SET(PARENT.DNS[ITER].DN[2].ETYPE,'FIRST-
   NEW-SUBSYS');
#SETSIZE(PARENT.DNS[ITER].DN[2].VA.VS,0);
#SET(PARENT.DNS[ITER].DN[3].ETYPE,'SECOND-
   NEW-SUBSYS');
#SETSIZE(PARENT.DNS[ITER].DN[3].VA.VS,0),
#ADD(ITER,1);
#ADD(DEVICEITER,1);
#ENDWHILE;
#ENDMACRO;
```

Users 4 may then add a new equipment component for the new subsystem's control type (118) by entering the equipment script as shown below. The equipment characteristics and child and parent sets should be set appropriately.

```
Script (DEFAULT_NAME)
#EXECUTE(CREATE_DEVICE_VARIABLES);
#FORMAT('C[%03S]    [%02S]',SUBSYS_ID,NEXT_CU_ID);
#SETSIZE(VARIABLESET.VS,1);
#SET(VARIABLESET.VS[0].NAME,'CUDSCS_IF_NUMBER');
#SET(VARIABLESET.VS[0].ALLOWED_VALUES,'0-6, 8-15');
#SET(VARIABLESET.VS[0].VALUE,'0');
#ADDALPHASTRING(NEXT_CU_ID,1);
Script (MACRO)
#MACRO(USDXXXX-D-SCSI2W-CU);
#SET(CUINST,INST);
#ENDMACRO;
Script (REFRESH) // Leave blank
Script (CAN_CONNECT) // Leave blank
Script (ON_CONNECT) // Leave blank
Script (ON_DISCONNECT)
#SUBALPHASTRING(NEXT_CU_ID,1);
Script (VALIDATE)
#TEMP(RETURNVAL,0,NUMERIC);
#EXECUTE(VALIDATE_MINIMUMS);
#EXECUTE(VALIDATE_USERNAME);
#EXECUTE(VALIDATE_CU_INTERFACE_NUMBERS);
#VALIDATECUCONN(4);
#RETURN(RETURNVAL);
```

Next, users 4 may add a new equipment component for the new subsystem's peripheral device (120), such as a disk or tape, and set the equipment characteristics and child and parent sets appropriately. Users 4 may interact with portion 104 of graphical interface 100 to input the equipment script as shown below. The bold type text must be updated with the specific values for the new disk or tape

```
Script (DEFAULT_NAME)
#EXECUTE(CREATE_DEVICE_VARIABLES);
#FORMAT('D[%03S]    [%02S]',SUBSYS_ID,NEXT_PERIPHERAL_ID);
#SETSIZE(VARIABLESET.VS,1);
#SET(VARIABLESET.VS[0]NAME,'SCDISK_IF_NUMBER');
#SET(VARIABLESET.VS[0].ALLOWED_VALUES, '0');
#SET(VARIABLESET.VS[0].VALUE,'0');
#ADD(PERIPHERAL_COUNT,1);
#ADDALPHASTRING(NEXT_PERIPHERAL_ID,1);.
Script (MACRO)
#MACRO(USDXXXX-D-SCDISK);
#SET(DISKINST,INST);
#ENDMACRO;
Script (REFRESH) // Leave blank
Script (CAN_CONNECT) // Leave blank
Script (ON_CONNECT)
#ADD(PARENT_COUNT,1);
Script (ON_DISCONNECT)
#IF(PARENT_COUNT{E}1);
#SUB(PERIPHERAL_COUNT,1);
#SUBALPHASTRING(NEXT_PERIPHERAL_ID,1);
#ENDIF;
#SUB(PARENT_COUNT,1);
Script (VALIDATE)
#TEMP(RETURNVAL,RUN_PARTITION_SCRIPT, NUMERIC);
#EXECUTE(VALIDATE_MINIMUMS);
#EXECUTE(VALIDATE_USERNAME);
#EXECUTE(VALIDATE_INTERFACE_NUMBERS);
#RETURN(RETURNVAL);
```

After entering the script given above, users 4 may add the new subsystem, control unit, and device equipment names to the appropriate count sets (122) and add a subsystem name map component for the subsystem (124). In addition, users 4 may create a new subsystem name map for each channel if the subsystem may be connected to multiple SCMS II channel types. Users 4 may then validate HDF 18 by selecting the validate option from toolbar 106 of graphical user interface 100 (126). If users 4 have correctly created HDF 18, no errors will be returned and HDF 18 can be loaded into SCMS II (128) thereby adding a new subsystem.

Various embodiments of the invention have been described. These and other embodiments are within the scope of the following claims.

The invention claimed is:

1. A computer system comprising:
   a set of hardware components;
   a configuration file having configuration data for the set of hardware components and embedded scripts for validating the configuration data; and
   a configuration program executing on a processor of the computer system, wherein the configuration program parses the configuration file to identify the scripts, and executes the scripts to validate the configuration data.

2. The system of claim 1,
   wherein the configuration program presents an interface by which a user modifies a configuration parameter for the configuration data, and
   wherein in response to an operation by the user, the configuration program selects one or more of the scripts based on the modified configuration parameter and executes the selected scripts to determine whether the modified parameter results in an invalid configuration for the computer system.

3. The computer system of claim 1, wherein the configuration program executes the scripts in real-time when the user modifies the configuration parameter and outputs error information when the modified parameter produces an invalid configuration.

4. The computer system of claim 3, wherein the configuration program executes the scripts in real-time solely for the modified parameter without requiring validation of the entire configuration data.

5. The computer system of claim 1, wherein the configuration file is external to the configuration program.

6. The computer system of claim 1, wherein the configuration program includes a validation engine that does not include logic specific to the hardware components.

7. The computer system of claim 1,
   wherein the configuration program includes triggers that fire in response to operations by the user, and
   wherein the triggers apply one or more of the scripts in response to the operations to determine whether the operations result in an invalid configuration of the computer system.

8. The computer system of claim 1, wherein the configuration file conforms to a data description language.

9. The computer system of claim 7, wherein the configuration file conforms to the extensible markup language (XML).

10. The computer system of claim 7, wherein the scripts are written in accordance with a character set that does not overlap a character set of the data description language.

11. The computer system of claim 1, further comprising:
a first parser to parse metadata within the configuration file that specifies the configuration data in a format that conforms to a data description language; and
a second parser to parse the scripts embedded within the configuration file that conform to a scripting language that does not overlap with the data description language.

12. A computer-implemented method comprising:
maintaining a configuration file having configuration data for a set of hardware components associated with a computer system and embedded scripts for validating the configuration data;
executing a configuration program on a processor of the computer system that parses the configuration file to identify the scripts and executes the scripts to validate the configuration data.

13. The method of claim 12, further comprising:
modifying a configuration parameter for the configuration data;
selecting one or more of the scripts based on the modified configuration parameter; and
executing the selected scripts to determine whether the modified parameter results in an invalid configuration for the computer system, wherein a user interacts with a user interface presented by the configuration program to modify the configuration parameter.

14. The method of claim 12, wherein executing the scripts comprises executing the scripts in real-time in response to modifying a configuration parameter for the configuration data and outputting error information when the modified parameter produces an invalid configuration of the computer system.

15. The method of claim 14, wherein executing the scripts comprises executing the scripts in real-time solely for the modified parameter without validating the entire configuration data.

16. The method of claim 12, wherein the configuration file is external to the configuration program.

17. The method of claim 12, wherein the configuration program includes a validation engine that does not include logic specific to the hardware components.

18. The method of claim 12, further comprising:
performing an operation on the configuration data;
executing one or more of the scripts in response to the operation, wherein the configuration program includes triggers that fire in response to the operation; and
determining whether the operation results in an invalid configuration of the computer system.

19. The method of claim 12, wherein the configuration file conforms to a data description language.

20. The method of claim 19, wherein the configuration file conforms to the extensible markup language (XML).

21. The method of claim 19, wherein the scripts are written in accordance with a character set that does not overlap a character set of the data description language.

22. The method of claim 12, further comprising:
parsing metadata within the configuration file that specifies the configuration data in a format that conforms to a data description language; and
parsing the scripts embedded within the configuration file that conform to a scripting language that does not overlap with the data description language.

23. A computer system comprising:
a set of hardware components;
a configuration file having configuration data for the set of hardware components and embedded scripts for validating the configuration data;
means for parsing the configuration file to identify the configuration data and any corresponding embedded scripts; and
means for executing the scripts in real-time to validate the configuration data in response operations by the user.

* * * * *